United States Patent
McCaughan et al.

(10) Patent No.: US 9,524,061 B2
(45) Date of Patent: Dec. 20, 2016

(54) TOUCH-SENSITIVE DISPLAY DEVICES

(75) Inventors: Gareth John McCaughan, Cambridgeshire (GB); Paul Richard Routley, Cambridgeshire (GB); John Andrew, Cambridgeshire (GB); Euan Christopher Smith, Cambridgeshire (GB); Peter William Tudor Mash, Cambridgeshire (GB)

(73) Assignee: Promethean Limited (GB)

( * ) Notice: Subject to any disclaimer, the term of this patent is extended or adjusted under 35 U.S.C. 154(b) by 200 days.

(21) Appl. No.: 14/126,254

(22) PCT Filed: Jun. 15, 2012

(86) PCT No.: PCT/GB2012/051382
§ 371 (c)(1),
(2), (4) Date: Mar. 28, 2014

(87) PCT Pub. No.: WO2012/172363
PCT Pub. Date: Dec. 20, 2012

(65) Prior Publication Data
US 2014/0232695 A1    Aug. 21, 2014

Related U.S. Application Data

(60) Provisional application No. 61/508,940, filed on Jul. 18, 2011.

(30) Foreign Application Priority Data

Jun. 16, 2011    (GB) .................................. 1110159.9

(51) Int. Cl.
*G06F 3/042*    (2006.01)

(52) U.S. Cl.
CPC ........... *G06F 3/0425* (2013.01); *G06F 3/0426* (2013.01)

(58) Field of Classification Search
None
See application file for complete search history.

(56) References Cited

U.S. PATENT DOCUMENTS

| 4,943,806 A * | 7/1990 | Masters | ................ G06F 3/0421 178/18.09 |
| 5,767,842 A | 6/1998 | Korth | |

(Continued)

FOREIGN PATENT DOCUMENTS

| WO | 01/93182 | 12/2001 |
| WO | 0193006 | 12/2001 |

(Continued)

OTHER PUBLICATIONS

International Search Report, dated Jan. 15, 2013, from corresponding International Application Serial No. PCT/GB2012/051382.

(Continued)

*Primary Examiner* — Claire X Pappas
*Assistant Examiner* — Benjamin Casarez
(74) *Attorney, Agent, or Firm* — Brient Globerman, LLC; Kyle M. Globerman

(57) ABSTRACT

We describe a touch sensitive image display device including: an image projector to project a displayed image onto a surface; a touch sensor light source to project a plane of light above the displayed image; a camera to capture a touch sense image from light scattered from the plane of light by an approaching object; and a signal processor to process the touch sense image to identify a location of the object. The touch sensor light source is amplitude modulated, and signal processor is further configured to process a plurality of the touch sense images captured when the touch sensor light source is off to compensate for ambient light in a touch sense image captured when the touch sensor light source is on.

14 Claims, 14 Drawing Sheets

(56) References Cited

U.S. PATENT DOCUMENTS

| | | |
|---|---|---|
| 6,281,878 B1 | 8/2001 | Montellese |
| 6,377,238 B1 | 4/2002 | McPheters |
| 6,611,921 B2 | 8/2003 | Casebolt |
| 6,614,422 B1 | 9/2003 | Rafii |
| 6,650,318 B1 | 11/2003 | Arnon |
| 6,690,357 B1 | 2/2004 | Dunton |
| 6,710,770 B2 | 3/2004 | Tomasi |
| 7,084,857 B2 | 8/2006 | Lieberman |
| 7,242,388 B2 | 7/2007 | Lieberman |
| 7,268,692 B1 | 9/2007 | Lieberman |
| 7,305,368 B2 | 12/2007 | Lieberman |
| 7,394,459 B2 | 7/2008 | Bathiche |
| 7,417,681 B2 | 8/2008 | Lieberman |
| 7,519,223 B2 | 4/2009 | Dehlin |
| D595,785 S | 7/2009 | Wells |
| 7,599,561 B2 | 10/2009 | Wilson |
| 7,670,006 B2 | 3/2010 | Lieberman |
| 7,893,924 B2 | 2/2011 | Lieberman |
| 2002/0021287 A1 | 2/2002 | Tomasi |
| 2004/0196371 A1* | 10/2004 | Kono ............... H04N 5/2251 348/162 |
| 2005/0281475 A1* | 12/2005 | Wilson ............... G06F 3/0421 382/254 |
| 2007/0019103 A1 | 1/2007 | Lieberman |
| 2008/0062123 A1* | 3/2008 | Bell ................... G06F 3/011 345/156 |
| 2008/0088593 A1* | 4/2008 | Smoot ............... G06F 3/0425 345/173 |
| 2008/0122803 A1* | 5/2008 | Izadi ................. G06F 3/0421 345/175 |
| 2009/0027335 A1 | 1/2009 | Ye |
| 2009/0091554 A1* | 4/2009 | Keam ............... G06F 3/0421 345/175 |
| 2009/0278799 A1* | 11/2009 | Wilson ............... G06F 3/0304 345/158 |
| 2010/0271336 A1* | 10/2010 | Harada ............... G06F 3/0412 345/175 |
| 2011/0147569 A1* | 6/2011 | Drumm ............... G06F 3/0421 250/208.6 |
| 2011/0205185 A1* | 8/2011 | Newton ............... G06F 3/011 345/175 |
| 2011/0221706 A1* | 9/2011 | McGibney ........... G06F 3/0428 345/175 |
| 2011/0234535 A1* | 9/2011 | Hung ................. G06F 3/0425 345/175 |
| 2012/0162077 A1* | 6/2012 | Sze .................... G06F 3/0425 345/163 |
| 2012/0200538 A1* | 8/2012 | Christiansson ....... G06F 3/0418 345/175 |
| 2014/0014812 A1* | 1/2014 | Utukuri ............... G06F 3/0416 250/206.1 |

FOREIGN PATENT DOCUMENTS

| | | |
|---|---|---|
| WO | 2006/108443 | 10/2006 |
| WO | 2008/038275 | 4/2008 |
| WO | WO 2010/073045 | 7/2010 |

OTHER PUBLICATIONS

International Preliminary Report on Patentability, dated Dec. 17, 2013, from corresponding International Application Serial No. PCT/GB2012/051382.

Written Opinion of the International Searching Authority, dated Jan. 15, 2013, from corresponding International Application Serial No. PCT/GB2012/051382.

* cited by examiner

TOUCH-SENSITIVE DISPLAY DEVICES

CROSS REFERENCE TO RELATED APPLICATION

This application claims priority to PCT/GB2012/051382 entitled "Touch Sensitive Display Devices" and filed Jun. 15, 2012, which itself claims priority to U.S. Application 61/508,940 filed Jul. 18, 2011 and to GB 1110159.9 filed Jun. 16, 2011. The entirety of each of the aforementioned applications is incorporated herein by reference for all purposes.

FIELD OF THE INVENTION

This invention relates to touch sensitive image projection systems, and to related methods and corresponding processor control code. More particularly the invention relates to systems employing image projection techniques in combination with a touch sensing system which projects a plane of light adjacent the displayed image.

Aspects of the invention relate to enabling improved operation of such systems in bright ambient light conditions.

BACKGROUND OF THE INVENTION

Background prior art relating to touch sensing systems employing a plane of light can be found in U.S. Pat. No. 6,281,878 (Montellese), and in various later patents of Lumio/VKB Inc, such as U.S. Pat. No. 7,305,368, as well as in similar patents held by Canesta Inc, for example U.S. Pat. No. 6,710,770. Broadly speaking these systems project a fan-shaped plane of infrared (IR) light just above a displayed image and use a camera to detect the light scattered from this plane by a finger or other object reaching through to approach or touch the displayed image.

Further background prior art can be found in: WO01/93006; U.S. Pat. Nos. 6,650,318; 7,305,368; 7,084,857; 7,268,692; 7,417,681; 7,242,388 (US2007/222760); US2007/019103; WO01/93006; WO01/93182; WO2008/038275; US2006/187199; U.S. Pat. Nos. 6,614,422; 6,710,770 (US2002021287); U.S. Pat. Nos. 7,593,593; 7,599,561; 7,519,223; 7,394,459; 6,611,921; U.S. Pat. D 595,785; U.S. Pat. Nos. 6,690,357; 6,377,238; 5,767,842; WO2006/108443; WO2008/146098; U.S. Pat. No. 6,367,933 (WO00/21282); WO02/101443; U.S. Pat. Nos. 6,491,400; 7,379,619; US2004/0095315; U.S. Pat. Nos. 6,281,878; 6,031,519; GB2,343,023A; U.S. Pat. No. 4,384,201; DE 41 21 180A; and US2006/244720.

We have previously described techniques for improved touch sensitive holographic displays, in particular in our earlier patent applications: WO2010/073024; WO2010/073045; and WO2010/073047. In such systems the camera viewing the plane or fan of light detects a certain amount of ambient light as well as the light scattered by a user's fingertip. Where an infrared (IR) laser is used to generate the touch sensing plane of light the amount of ambient light can be reduced by employing an optical notch filter at the laser wavelength, but further suppression of ambient light is desirable. One technique to achieve this involves alternating "IR laser off" with "IR laser on" frames. Touch detection is then implemented on the difference of these frames to subtract out any ambient IR in the scene. However, this can cause problems: For example when a finger is moving so rapidly that it is in a different place in the laser off and laser on frames this can cause a false touch event.

SUMMARY OF THE INVENTION

According to a first aspect of the invention there is therefore provided a touch sensitive image display device, the device comprising: an image projector to project a displayed image onto a surface in front of the device; a touch sensor light source to project a plane of light above said displayed image; a camera directed to capture a touch sense image from a region including at least a portion of said plane of light, said touch sense image comprising light scattered from said plane of light by an object approaching said displayed image; and a signal processor coupled to said camera, to process a said touch sense image from said camera to identify a location of said object relative to said displayed image; wherein said touch sensor light source is amplitude modulated; and wherein said signal processor is further configured to: process a plurality of said captured touch sense images captured when said touch sensor light source is off to compensate for ambient light in a said captured touch sense image captured when said touch sensor light source is on. In some preferred embodiments the images captured when said touch sensor light source is off comprise at least one image before and after said captured touch sense image captured when said touch sensor light source is on. In embodiments the amplitude modulation modulates the laser output between a state in which the laser is on and a state in which the laser is substantially off; the modulation may thus be on-off modulation. In some embodiments the signal processor is configured to determine a difference between the image captured when the light source is on and a weighted sum of each of the images captured when the light source is off. Alternatively an estimated image of the ambient light may be determined by comparing corresponding pixels or regions of the images captured when the light source is off to determine, for each pixel or region, a maximum detected light level in the images.

In embodiments the signal processor is configured to determine two difference images, a first difference image between an image captured when the light source is on and a preceding image when the light source is off, and a second difference image between the "on" image and the following "off" image. The signal processing may then select (optionally on a row-by-row basis) data, for processing to identify the location of the object, dependent on the two difference images. In particular one of the two difference images may be used as a mask for the other of the two images.

Alternatively the signal processor may determine an estimated image of the ambient light by digitally filtering images captured when the touch sensor light source is off, for example using an infinite impulse response filter or running average calculation. The digital filtering may comprise combining a previous estimated image of said ambient light with a subsequent image captured when the touch sensor light source is off According to a related aspect of the invention there is provided a method of ambient light interference suppression in a touch sensitive image display device, the device comprising: an image projector to project a displayed image onto a surface in front of the device; a touch sensor light source to project a plane of light above said displayed image; a camera directed to capture a touch sense image from a region including at least a portion of said plane of light, said touch sense image comprising light scattered from said plane of light by an object approaching said displayed image; and a signal processor coupled to said camera, to process a said touch sense image from said camera to identify a location of said object relative to said displayed image; the method comprising: amplitude modulating said touch sensor light source; and processing a plurality of said captured touch sense images captured when said touch sensor light source is off to compensate for ambient light in a said captured touch sense image captured when said touch sensor light source is on. In embodiments the method further comprises determining, from corresponding pixels or regions of the images captured when the touch sensor light source is off, for each pixel or region a function of a detected light level in said images when the touch sensor light source is off, to determine an image of the ambient light. This may comprise comparing corresponding pixels or regions of said images captured when the touch sensor light source is off to determine, for each pixel or region, a maximum detected light level in the images, using the maximum detected light levels to determine an image of the ambient light (for compensating a touch sense image captured when the touch sensor light source is on).

According to a further aspect of the invention there is provided a touch sensitive image display device, the device comprising: an image projector to project a displayed image onto a surface in front of the device; a touch sensor light source to project a plane of light above said displayed image; a camera directed to capture a touch sense image from a region including at least a portion of said plane of light, said touch sense image comprising light scattered from said plane of light by an object approaching said displayed image; and a signal processor coupled to said camera, to process a said touch sense image from said camera to identify a location of said object relative to said displayed image; wherein said device further comprises: a filter in front of said camera configured such that a first set of pixels of said camera receive light at a first peak wavelength and a second set of pixels of said camera receive light of a second, different peak wavelength, wherein said first set of pixels receive more light from said touch sensor light source than said second set of pixels.

The signal processor may further be configured to compensate for ambient light in data from the first set of pixels using data from the second set of pixels. The touch sensor light source may be an infrared (IR) light source, the camera may be a color camera, and the filter may comprises a multi-color filter in front of an image sensor of the camera. Then the first and second sets of pixels may comprise pixels selected from red, blue and green sensitive pixels of the color camera. In such a case the signal processor may determine an image of the scattered light by solving, for each pixel, at least two simultaneous equations dependent on respectively light level data from a pixel of each of the first and second sets of pixels, to extract a signal level of the scattered light from an ambient light signal level. Alternatively the signal processor may perform a least squares fit of the signal from the scattered light to light level data from pixels of the first and second sets of pixels, to solve (overdetermined) sets of simultaneous equations. According to a further aspect of the invention there is provided a touch sensitive image display device, the device comprising: an image projector to project a displayed image onto a surface in front of the device; a touch sensor light source to project a plane of light above said displayed image; a camera directed to capture a touch sense image from a region including at least a portion of said plane of light, said touch sense image comprising light scattered from said plane of light by an object approaching said displayed image; and a signal processor coupled to said camera, to process a said touch sense image from said camera to identify a location of said object relative to said displayed image; wherein said device further comprises: a system to modulate said touch sensor light source responsive to a modulation signal; and wherein each of a plurality of pixels of said camera has an associated signal processing circuit, coupled to receive said modulation signal, and configured to suppress a component of a light level signal from a respective pixel not modulated by said modulation signal. The device may include a signal generator to generate the modulation signal. According to a further aspect of the invention there is provided a touch sensitive image display device, the device comprising: an image projector to project a displayed image onto a surface in front of the device; a touch sensor light source to project a plane of light above said displayed image; a camera directed to capture a touch sense image from a region including at least a portion of said plane of light, said touch sense image comprising light scattered from said plane of light by an object approaching said displayed image; and a signal processor coupled to said camera, to process a said touch sense image from said camera to identify a location of said object relative to said displayed image; wherein said device further comprises: a system to modulate said touch sensor light source responsive to a modulation signal to generate a temporal modulation pattern of said touch sensor light source; and wherein said signal processor is configured to process captured touch sense images defining said temporal modulation light pattern to suppress ambient light in a said captured touch sense image, wherein said captured touch sense images defining said temporal modulation comprise more than just a single laser on a single laser off image. According to a further aspect of the invention there is provided a touch sensitive image display device, the device comprising: an image projector to project a displayed image onto a surface in front of the device; a touch sensor light source to project a plane of light above said displayed image; a camera directed to capture a touch sense image from a region including at least a portion of said plane of light, said touch sense image comprising light scattered from said plane of light by an object approaching said displayed image; and a signal processor coupled to said camera, to process a said touch sense image from said camera to identify a location of said object relative to said displayed image; wherein said device further comprises; a system to encode a spatial pattern in one or both of said projected plane of light and a said captured image; and wherein said signal processor is further configured to selectively detect said spatial pattern in a said captured touch sense image to suppress ambient illumination.

The system to encode the spatial pattern in the plane of light may comprise a diffractive optical element. Alternatively, if the camera is a rolling shutter camera the system to encode the spatial pattern may comprise a system to (time) modulate the touch sensor light source.

According to a further aspect of the invention there is provided a touch sensitive image display device, the device comprising: an image projector to project a displayed image onto a surface in front of the device; a touch sensor light source to project a plane of light above said displayed image; a camera directed to capture a touch sense image from a region including at least a portion of said plane of light, said touch sense image comprising light scattered from said plane of light by an object approaching said displayed image; and a signal processor coupled to said camera, to process a said touch sense image from said camera to identify a location of said object relative to said displayed image; wherein said signal processor is further configured to: determine a level of ambient illumination from captured touch sense images captured by said camera when said touch sensor light source is on; compensate for said determined level of ambient illumination in a captured touch sense image to provide an ambient-compensated touch sense image; and process said ambient-compensated touch service image to determine position data for said object from said image of light scattered by said object. The signal processor may estimate an image of the ambient illumination from the captured touch sense images captured by the camera when the touch sensor light source is on. According to a further aspect of the invention there is provided a touch sensitive image display device, the device comprising: an image projector to project a displayed image onto a surface in front of the device; a touch sensor light source to project a plane of light above said displayed image; a camera directed to capture a touch sense image from a region including at least a portion of said plane of light, said touch sense image comprising light scattered from said plane of light by an object approaching said displayed image; and a signal processor coupled to said camera, to process a said touch sense image from said camera to identify a location of said object relative to said displayed image; wherein said signal processor is further configured to: spatially filter a said touch sense image prior to said object location identification to reject light scattered from a region predicted to be shadowed by an object, or portion of an object, nearer said touch sensor light source than said region.

According to a further aspect of the invention there is provided a touch sensitive image display device, the device comprising: an image projector to project a displayed image onto a surface in front of the device; a touch sensor light source to project a plane of light above said displayed image, wherein said touch sensor light projection is amplitude modulated; a camera directed to capture a touch sense image from a region including at least a portion of said plane of light, said touch sense image comprising light scattered from said plane of light by an object approaching said displayed image; and a signal processor coupled to said camera, configured to: compensate for ambient light captured by said camera by determining a difference image, wherein said difference image is dependent on a difference between a said touch sense image captured when said touch sensor light projection is on and a said touch sense image captured when said touch sensor light projection is off; process said difference image, or an image derived from said difference image, to perform one or both of image erosion and image blurring, to generate a processed difference image comprising an eroded or blurred version of said difference image; and operate on said processed difference image to identify a location of said object relative to said displayed image. According to a further aspect of the invention there is provided a method of attenuating touch image artefacts in touch sensitive image display device, the device comprising: an image projector to project a displayed image onto a surface in front of the device; a touch sensor light source to project a plane of light above said displayed image, wherein said touch sensor light projection is amplitude modulated; a camera directed to capture a touch sense image from a region including at least a portion of said plane of light, said touch sense image comprising light scattered from said plane of light by an object approaching said displayed image; and a signal processor coupled to said camera, the method comprising: compensating for ambient light captured by said camera by determining a difference image, wherein said difference image is dependent on a difference between a said touch sense image captured when said touch sensor light projection is on and a said touch sense image captured when said touch sensor light projection is off; eroding and/or blurring said difference image, or an image derived from said difference image, to generate a processed difference image; and operating on said processed difference image to identify a location of said object relative to said displayed image; wherein said difference image comprises signed image data; and wherein said eroding/blurring comprises eroding/blurring until substantially all negative image data has been removed from said difference image. According to a further aspect of the invention there is provided a touch sensitive image display device, the device comprising: an image projector to project a displayed image onto a surface in front of the device; a touch sensor laser light source to project a plane of light above said displayed image; a camera directed to capture a touch sense image from a region including at least a portion of said plane of light, said touch sense image comprising light scattered from said plane of light by an object approaching said displayed image; and a signal processor coupled to said camera, to process a said touch sense image from said camera to identify a location of said object relative to said displayed image; wherein said signal processor is further configured to high-pass filter data from a said touch sense image to attenuate spatial frequencies below a threshold spatial frequency prior to said processing to identify said location of said object, in particular to selectively enhance speckle in the scattered light as compared with captured ambient or background light in wherein said touch sense image. Optionally the camera may be defocused to deliberately enhance this speckle. A touch sensitive image display device as described above may further include a system to select one or more of the ambient light suppression techniques for processing the captured touch sense images prior to identifying of the location of the object, preferably responsive to a detected level of said ambient light.

According to a further aspect of the invention there is provided a touch sensitive image display device, the device comprising: an image projector to project a displayed image onto a surface in front of the device; a touch sensor light source to project a plane of light above said displayed image at two discrete wavelengths; a camera directed to capture a touch sense image from a region including at least a portion of said plane of light, said touch sense image comprising light scattered from said plane of light by an object approaching said displayed image; and a signal processor coupled to said camera, to process a said touch sense image from said camera to identify a location of said object relative to said displayed image; and wherein said device further comprises: one or more optical wavelength notch filter in front of said camera; and a system to vary application of said one or more notch filters to said camera spatially and/or temporally to match each of said discrete wavelengths; and wherein said signal processor is further configured to process said spatial and/or temporal variation to suppress an ambient light level in a said captured image.

According to a further aspect of the invention there is provided a touch sensitive image display device, the device comprising: an image projector to project a displayed image onto a surface in front of the device; a touch sensor light source to project two planes of light above said displayed image, at different respective first and second positions; a camera directed to capture a touch sense image from a region including at least a portion of each said plane of light, said touch sense image comprising light scattered from said planes of light by an object approaching said displayed image; and a signal processor coupled to said camera, to process a plurality of said touch sense images from said camera to identify a location of said object relative to said displayed image.

The signal processor may be further configured to capture first and second touch sense images from different respective planes of light to distinguish scattered light from the same object from background or ambient illumination. Additionally or alternatively the signal processor may be configured to detect a variation in a location of the scattered light between captured touch sense images to distinguish scattered light from the same object from background or ambient illumination.

According to a further aspect of the invention there is provided a touch sensitive image display device, the device comprising: an image projector to project a displayed image onto a surface in front of the device; a touch sensor light source to project a plane of light above said displayed image; a first camera directed to capture a first touch sense image from a region including at least a portion of said plane of light, said first touch sense image comprising light scattered from said plane of light by an object approaching said displayed image; wherein said first camera has a viewing axis directed down towards said plane of light at an acute angle to a line in said plane of light; a second camera having a viewing axis directed substantially into a plane of said plane of light to capture a line image of said plane of light; and a signal processor coupled to said cameras, to process a said touch sense image from said cameras to identify a location of said object relative to said displayed image, wherein said signal processor is configured to filter or correlate said first touch sense image using said line image to reject a spurious signal in said first touch sense image absent from said line image. According to a further aspect of the invention there is provided a touch sensitive image display device, the device comprising: an image projector to project a displayed image onto a surface in front of the device; a touch sensor light source to project a plane of light above said displayed image; a camera having a viewing axis directed into said plane of light to capture a touch sense line image a comprising light scattered from said plane of light by an object approaching said displayed image; and a signal processor coupled to said camera, to process a said touch sense image from said camera to identify a location of said object relative to said displayed image; wherein said camera comprises an imaging system including an aperture; and wherein said signal processor is further configured to: process said line image to determine a distance of said object from said camera from a defocusing effect of said aperture on a captured image of said scattered light and a direction of said object from a location of said scattered light in said line image.

According to a further aspect of the invention there is provided a touch sensitive image display device, the device comprising: an image projector to project a displayed image onto a surface in front of the device; a touch sensor light source to project a plane of light above said displayed image; a camera having a viewing axis directed into said plane of light to capture a touch sense line image a comprising light scattered from said plane of light by an object approaching said displayed image; and a signal processor coupled to said camera, to process a said touch sense image from said camera to identify a location of said object relative to said displayed image; wherein said camera comprises either a) a plenoptic camera, or b) a pair of cameras; and wherein said signal processor is further configured to process said line image to determine both a distance of said object from said camera and a direction of said object from a location of said scattered light in said line image.

The plenoptic camera may have a lens array configured to separate images captured from different directions in a horizontal viewing plane of the camera into different vertically separate rows on a two dimensional sensor plane of the camera.

According to a still further aspect of the invention there is provided a plenoptic line camera comprising a 2D image sensor bearing a lens array, wherein said lens array is configured to separate images captured from different directions in a horizontal viewing plane of said camera into different vertically separate rows on a two dimensional sensor plane of said plenoptic camera.

The invention also provides methods corresponding to the above described operational features of a touch sensitive image display device.

The invention further provides processor control code configured to implement the above described signal processing. The code is provided on a physical carrier such as a disk, CD- or DVD-ROM, programmed memory or other physical computer-readable medium. Code and/or data to implement embodiments of the invention may comprise source, object or executable code in one or more conventional programming languages (interpreted or compiled), or the code may comprise code for setting up or controlling an ASIC (Application Specific Integrated Circuit) or FPGA (Field Programmable Gate Array) or code for a hardware description language such as Verilog, VHDL, or SystemC. As the skilled person will appreciate such code and/or data may be distributed between a plurality of coupled components in communication with one another.

The skilled person will appreciate that, in general, the signal processing we describe may be implemented in software, or in hardware (circuitry), or in a combination of the two.

Embodiments of each of the above described aspects of the invention are not limited to use with any particular type of projection technology. Thus although we will describe later an example of a holographic image projector, the techniques of the invention may also be applied to other forms of projection technology including, but not limited to, digital micromirror-based projectors such as projectors based on DLP™ (DIGITAL LIGHT PROCESSING) technology from Texas Instruments, Inc.

BRIEF DESCRIPTION OF THE DRAWINGS

These and other aspects of the invention will now be further described, by way of example only, with reference to the accompanying figures in which.

DETAILED DESCRIPTION

Figure 1A:
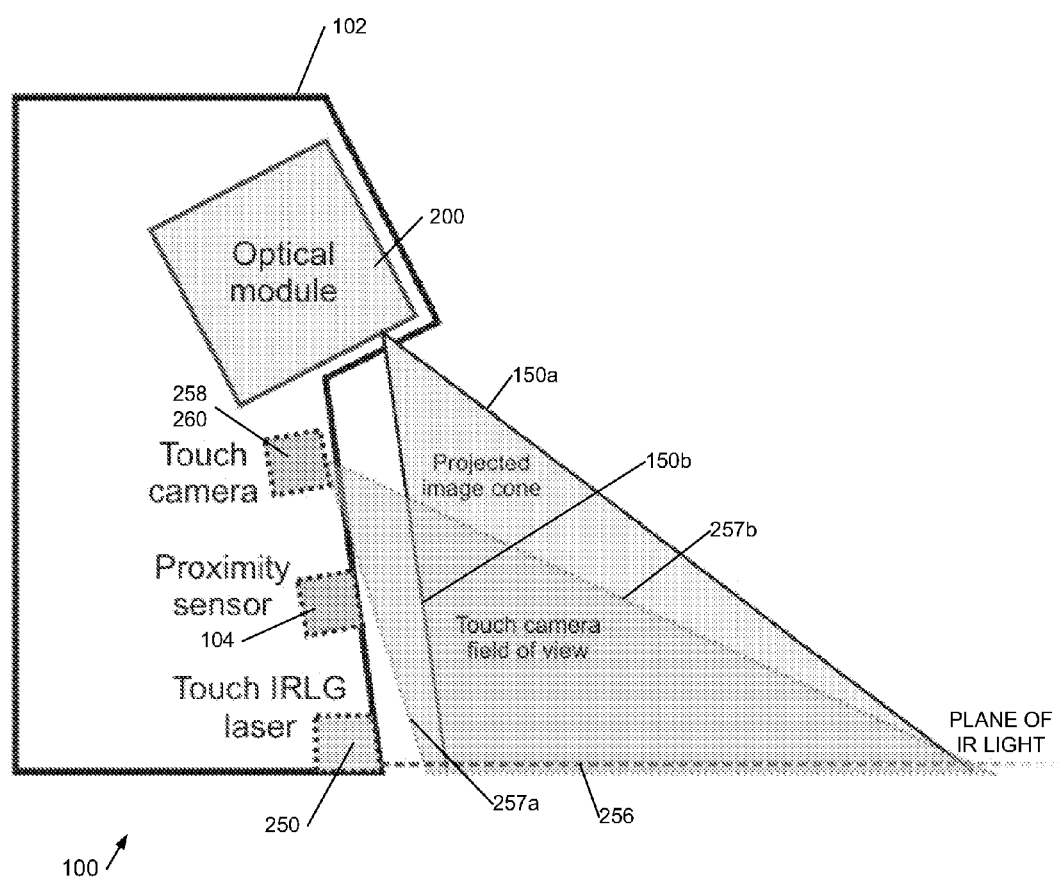
FIGS. 1a and 1b show, respectively, a vertical cross section view through an example touch sensitive image display device suitable for implementing embodiments of the invention, and details of a plane of light-based touch sensing system for the device.
Figure 1B:
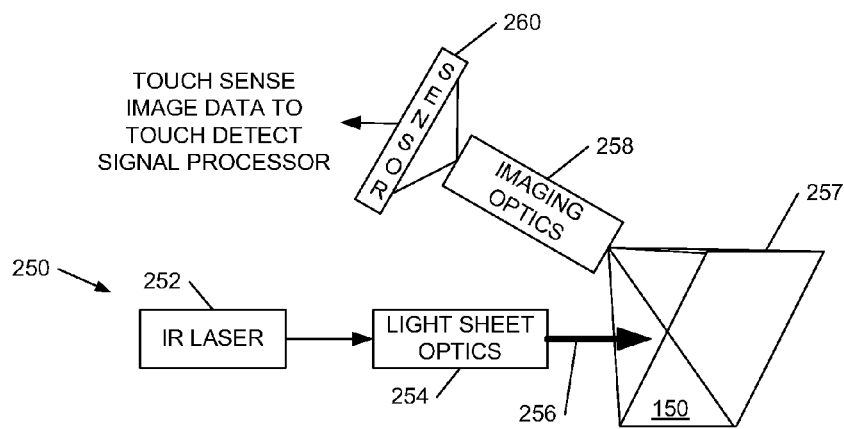

FIGS. 1a and 1b show an example touch sensitive holographic image projection device 100 comprising a holographic image projection module 200 and a touch sensing system 250, 258, 260 in a housing 102. A proximity sensor 104 may be employed to selectively power-up the device on detection of proximity of a user to the device.

A holographic image projector is merely described by way of example; the techniques we describe herein may be employed with any type of image projection system.

The holographic image projection module 200 is configured to project downwards and outwards onto a flat surface such as a tabletop. This entails projecting at an acute angle onto the display surface (the angle between a line joining the center of the output of the projection optics and the middle of the displayed image and a line in a plane of the displayed image is less than 90°). We sometimes refer to projection onto a horizontal surface, conveniently but not essentially non-orthogonally, as "table down projection". A holographic image projector is particularly suited to this application because it can provide a wide throw angle, long depth of field, and substantial distortion correction without significant loss of brightness/efficiency. Boundaries of the light forming the displayed image 150 are indicated by lines 150a, b. The touch sensing system 250, 258, 260 comprises an infrared laser illumination system (IR line generator) 250 configured to project a sheet of infrared light 256 just above, for example ~1 mm above, the surface of the displayed image 150 (although in principle the displayed image could be distant from the touch sensing surface). The laser illumination system 250 may comprise an IR LED or laser 252, preferably collimated, then expanded in one direction by light sheet optics 254, which may comprise a negative or cylindrical lens. Optionally light sheet optics 254 may include a 45 degree mirror adjacent the base of the housing 102 to fold the optical path to facilitate locating the plane of light just above the displayed image.

A CMOS imaging sensor (touch camera) 260 is provided with an ir-pass lens 258 captures light scattered by touching the displayed image 150, with an object such as a finger, through the sheet of infrared light 256. The boundaries of the CMOS imaging sensor field of view are indicated by lines 257, 257a,b. The touch camera 260 provides an output to touch detect signal processing circuitry as described further later.

Example Holographic Image Projection System

Figure 2B:
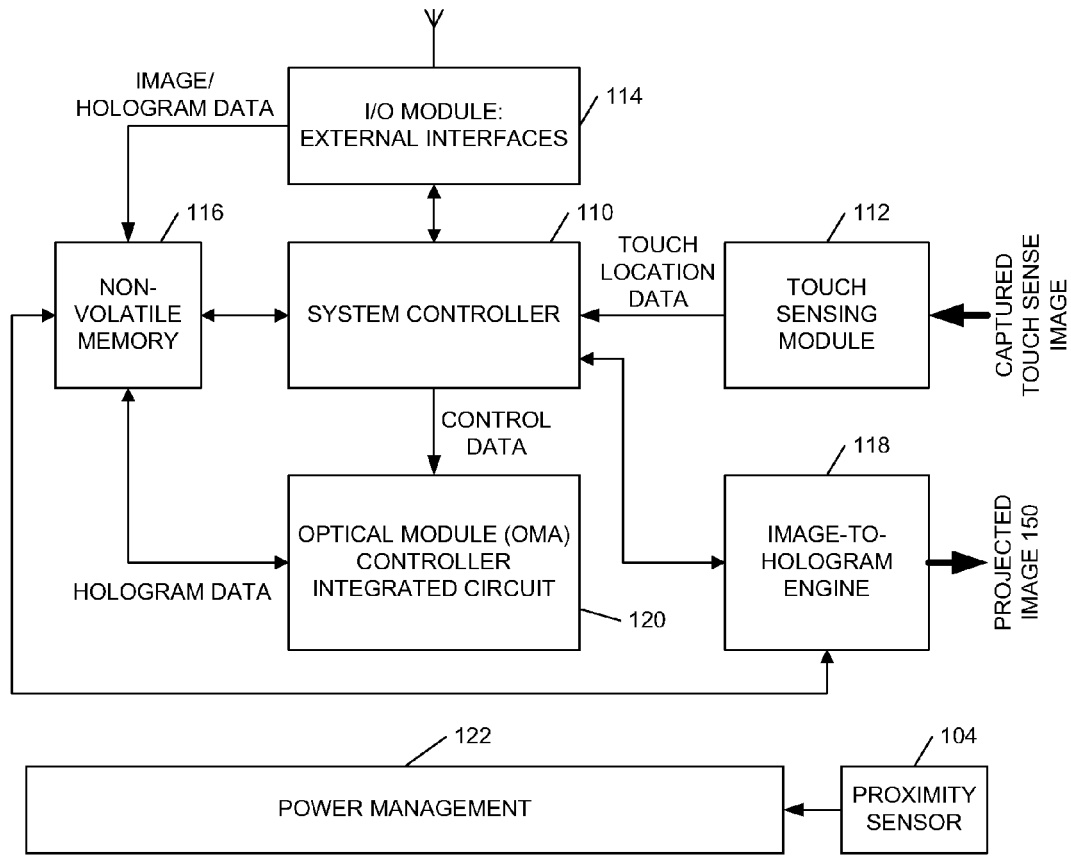
FIGS. 2a and 2b show, respectively, a holographic image projection system for use with the device of FIG. 1, and a functional block diagram of the device of FIG. 1.
Figure 2A:
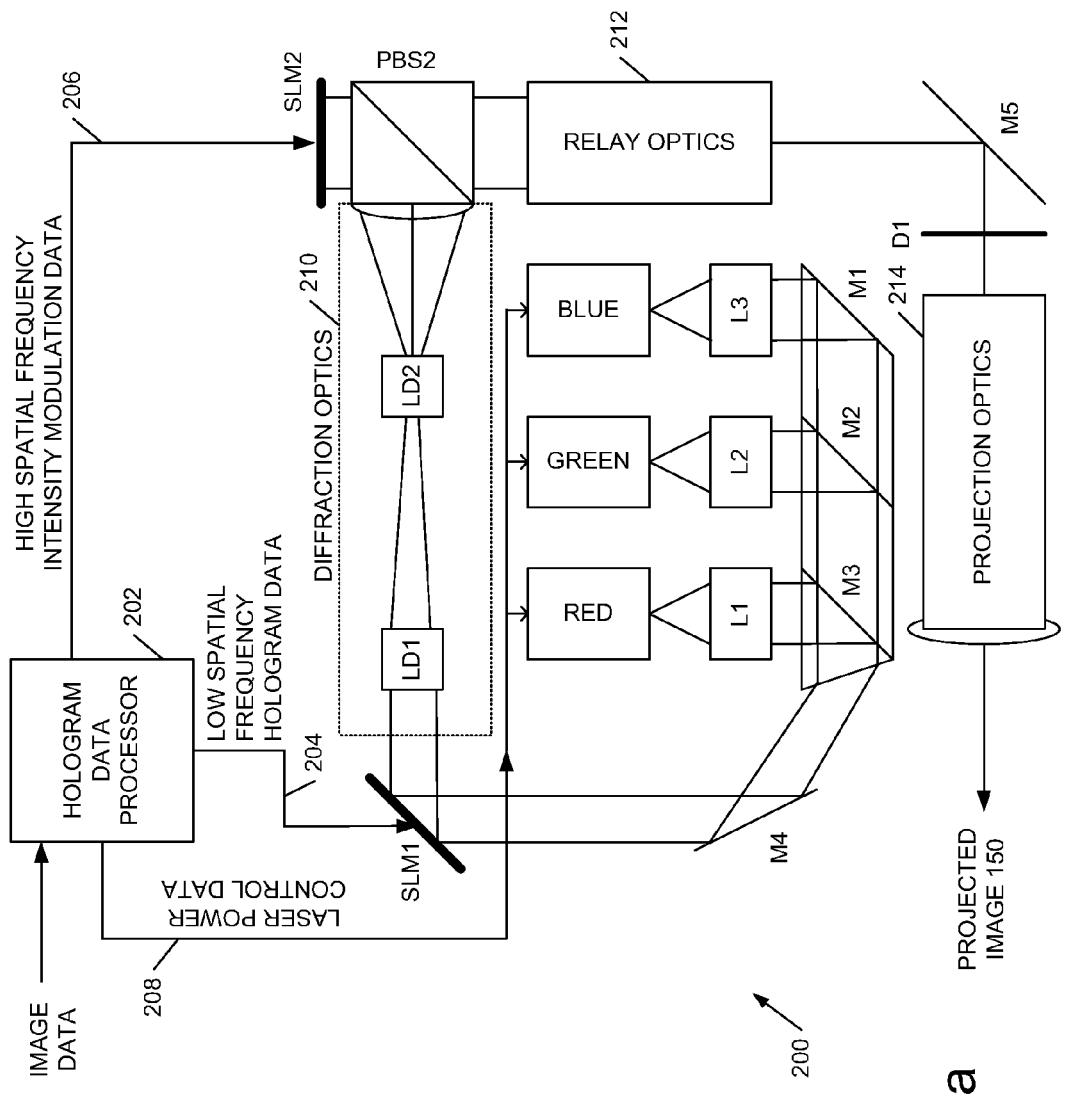

FIG. 2a shows an example holographic image projection system architecture 200 in which the SLM may advantageously be employed. The architecture of FIG. 2 uses dual SLM modulation—low resolution phase modulation and higher resolution amplitude (intensity) modulation. This can provide substantial improvements in image quality, power consumption and physical size. The primary gain of holographic projection over imaging is one of energy efficiency. Thus the low spatial frequencies of an image can be rendered holographically to maintain efficiency and the high-frequency components can be rendered with an intensity-modulating imaging panel, placed in a plane conjugate to the hologram SLM. Effectively, diffracted light from the hologram SLM device (SLM1) is used to illuminate the imaging SLM device (SLM2). Because the high-frequency components contain relatively little energy, the light blocked by the imaging SLM does not significantly decrease the efficiency of the system, unlike in a conventional imaging system. The hologram SLM is preferably be a fast multi-phase device, for example a pixel MEMS-based piston actuator device. In FIG. 2a:

SLM1 is a pixellated MEMS-based piston actuator SLM as described above, to display a hologram—for example a 160×160 pixel device with physically small lateral dimensions, e.g. <5 mm or <1 mm.

L1, L2 and L3 are collimation lenses (optional, depending upon the laser output) for respective Red, Green and Blue lasers.

M1, M2 and M3 are dichroic mirrors a implemented as prism assembly.

M4 is a turning beam mirror.

SLM2 is an imaging SLM and has a resolution at least equal to the target image resolution (e.g. 854×480); it may comprise a LCOS (liquid crystal on silicon) or DMD (Digital Micromirror Device) panel.

Diffraction optics 210 comprises lenses LD1 and LD2, forms an intermediate image plane on the surface of SLM2, and has effective focal length f such that $f\lambda/\Delta$ covers the active area of imaging SLM2. Thus optics 210 perform a spatial Fourier transform to form a far field illumination pattern in the Fourier plane, which illuminates SLM2.

PBS2 (Polarizing Beam Splitter 2) transmits incident light to SLM2, and reflects emergent light into the relay optics 212 (liquid crystal SLM2 rotates the polarization by 90 degrees). PBS2 preferably has a clear aperture at least as large as the active area of SLM2.

Relay optics 212 relay light to the diffuser D1.

M5 is a beam turning mirror.

D1 is a diffuser to reduce speckle.

Projection optics 214 project the object formed on D1 by the relay optics 212, and preferably provide a large throw angle, for example >90°, for angled projection down onto a table top (the design is simplified by the relatively low entendue from the diffuser).

The different colors are time-multiplexed and the sizes of the replayed images are scaled to match one another, for example by padding a target image for display with zeros (the field size of the displayed image depends upon the pixel size of the SLM not on the number of pixels in the hologram).

A system controller and hologram data processor 202, implemented in software and/or dedicated hardware, inputs image data and provides low spatial frequency hologram data 204 to SLM1 and higher spatial frequency intensity modulation data 206 to SLM2. The controller also provides laser light intensity control data 208 to each of the three lasers. For details of an example hologram calculation procedure reference may be made to WO2010/007404 (hereby incorporated by reference).

Control System

Referring now to FIG. 2b, this shows a block diagram of the device 100 of FIG. 1. A system controller 110 is coupled to a touch sensing module 112 from which it receives data defining one or more touched locations on the display area, either in rectangular or in distorted coordinates (in the latter case the system controller may perform keystone distortion compensation). The touch sensing module 112 in embodiments comprises a CMOS sensor driver and touch-detect processing circuitry.

The system controller 110 is also coupled to an input/output module 114 which provides a plurality of external interfaces, in particular for buttons, LEDs, optionally a USB and/or BLUETOOTH® interface, and a bi-directional wireless communication interface, for example using WIFI®. In embodiments the wireless interface may be employed to download data for display either in the form of images or in the form of hologram data. In an ordering/payment system this data may include price data for price updates, and the interface may provide a backhaul link for placing orders, handshaking to enable payment and the like. Non-volatile memory 116, for example Flash RAM is provided to store data for display, including hologram data, as well as distortion compensation data, and touch sensing control data (identifying regions and associated actions/links). Non-volatile memory 116 is coupled to the system controller and to the I/O module 114, as well as to an optional image-to-hologram engine 118 as previously described (also coupled to system controller 110), and to an optical module controller 120 for controlling the optics shown in FIG. 2a. (The image-to-hologram engine is optional as the device may receive hologram data for display from an external source). In embodiments the optical module controller 120 receives hologram data for display and drives the hologram display SLM, as well as controlling the laser output powers in order to compensate for brightness variations caused by varying coverage of the display area by the displayed image (for more details see, for example, our WO2008/075096). In embodiments the laser power(s) is(are) controlled dependent on the "coverage" of the image, with coverage defined as the sum of: the image pixel values, preferably raised to a power of gamma (where gamma is typically 2.2). The laser power is inversely dependent on (but not necessarily inversely proportional to) the coverage; in preferred embodiments a lookup table as employed to apply a programmable transfer function between coverage and laser power. The hologram data stored in the non-volatile memory, optionally received by interface 114, therefore in embodiments comprises data defining a power level for one or each of the lasers together with each hologram to be displayed; the hologram data may define a plurality of temporal holographic sub frames for a displayed image.

Preferred embodiments of the device also include a power management system 122 to control battery charging, monitor power consumption, invoke a sleep mode and the like.

In operation the system controller controls loading of the image/hologram data into the non-volatile memory, where necessary conversion of image data to hologram data, and loading of the hologram data into the optical module and control of the laser intensities. The system controller also performs distortion compensation and controls which image to display when and how the device responds to different "key" presses and includes software to keep track of a state of the device. The controller is also configured to transition between states (images) on detection of touch events with coordinates in the correct range, a detected touch triggering an event such as a display of another image and hence a transition to another state. The system controller 110 also, in embodiments, manages price updates of displayed menu items, and optionally payment, and the like.

Touch Sensing Systems

Figure 3A:
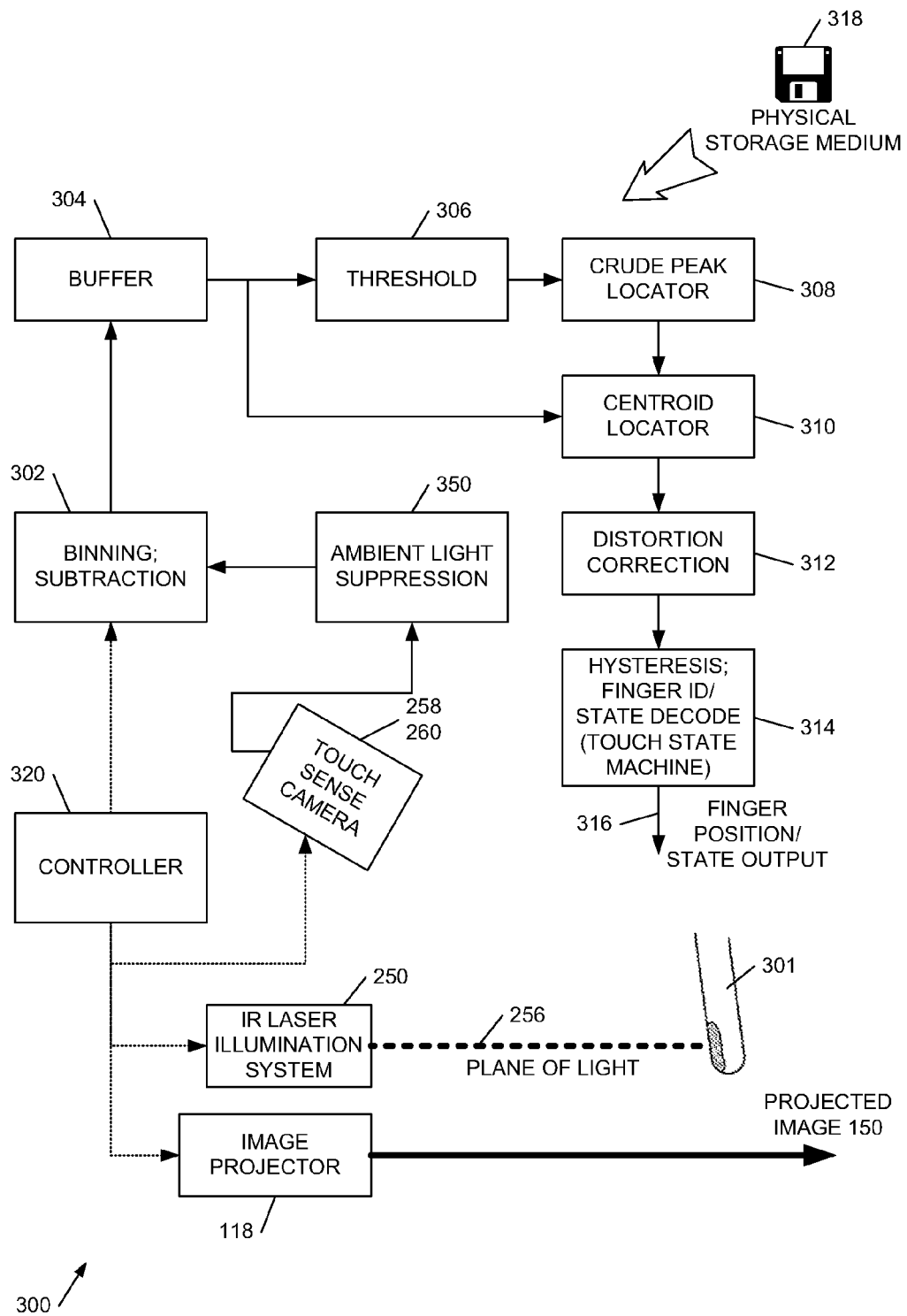
FIGS. 3a to 3g show, respectively, an embodiment of a touch sensitive image display device according to an aspect of the invention, use of a crude peak locator to find finger centroids, and the resulting finger locations, raw and processed images for high speed fan laser switching with a short camera integration time, raw and processed images for ambient light suppression using multiple laser-off images with a max filter algorithm, raw and processed images for ambient light suppression using multiple laser-off images with a mask filter algorithm, and an illustration of shadowing artefacts in a difference image between captured touch sense images.

Referring now to FIG. 3a, this shows an embodiment of a touch sensitive image display device 300 according to an aspect of the invention. The system comprises an infrared laser and optics 250 to generate a plane of light 256 viewed by a touch sense camera 258, 260 as previously described, the camera capturing the scattered light from one or more fingers 301 or other objects interacting with the plane of light. The system also includes an image projector 118, for example a holographic image projector, also as previously described. In the arrangement of FIG. 3a a controller 320 controls the IR laser on and off, controls the acquisition of images by camera 260 and controls projector 118. In the illustrated example images are captured with the IR laser on and off in alternate frames and touch detection is then performed on the difference of these frames to subtract out any ambient infrared. The image capture objects 258 preferably also include a notch filter at the laser wavelength which may be around 780-800 nm. Because of laser diodes process variations and change of wavelength with temperature this notch may be relatively wide, for example of order 20 nm and thus it is desirable to suppress ambient IR. In the embodiment of FIG. 3a subtraction is performed by module 302 which, in embodiments, is implemented in hardware (an FPGA).

In embodiments module 302 also performs binning of the camera pixels, for example down to approximately 80 by 50 pixels. This helps reduce the subsequent processing power/memory requirements and is described in more detail later. However such binning is optional, depending upon the processing power available, and even where processing power/memory is limited there are other options, as described further later. Following the binning and subtraction the captured image data is loaded into a buffer 304 for subsequent processing to identify the position of a finger or, in a multi-touch system, fingers.

Because the camera 260 is directed down towards the plane of light at an angle it can be desirable to provide a greater exposure time for portions of the captured image further from the device than for those nearer the device. This can be achieved, for example, with a rolling shutter device, under control of controller 320 setting appropriate camera registers.

Depending upon the processing of the captured touch sense images and/or the brightness of the laser illumination system, differencing alternate frames may not be necessary (for example, where 'finger shape' is detected). However where subtraction takes place the camera should have a gamma of substantial unity so that subtraction is performed with a linear signal.

Various different techniques for locating candidate finger/object touch positions will be described. In the illustrated example, however, an approach is employed which detects intensity peaks in the image and then employs a centroid finder to locate candidate finger positions. In embodiments this is performed in software. Processor control code and/or data to implement the aforementioned FPGA and/or software modules shown in FIG. 3 may be provided on a disk 318 or another physical storage medium. Thus in embodiments module 306 performs thresholding on a captured image and, in embodiments, this is also employed for image clipping or cropping to define a touch sensitive region.

Optionally some image scaling may also be performed in this module. Then a crude peak locator 308 is applied to the thresholded image to identify, approximately, regions in which a finger/object is potentially present.

Figure 3B:
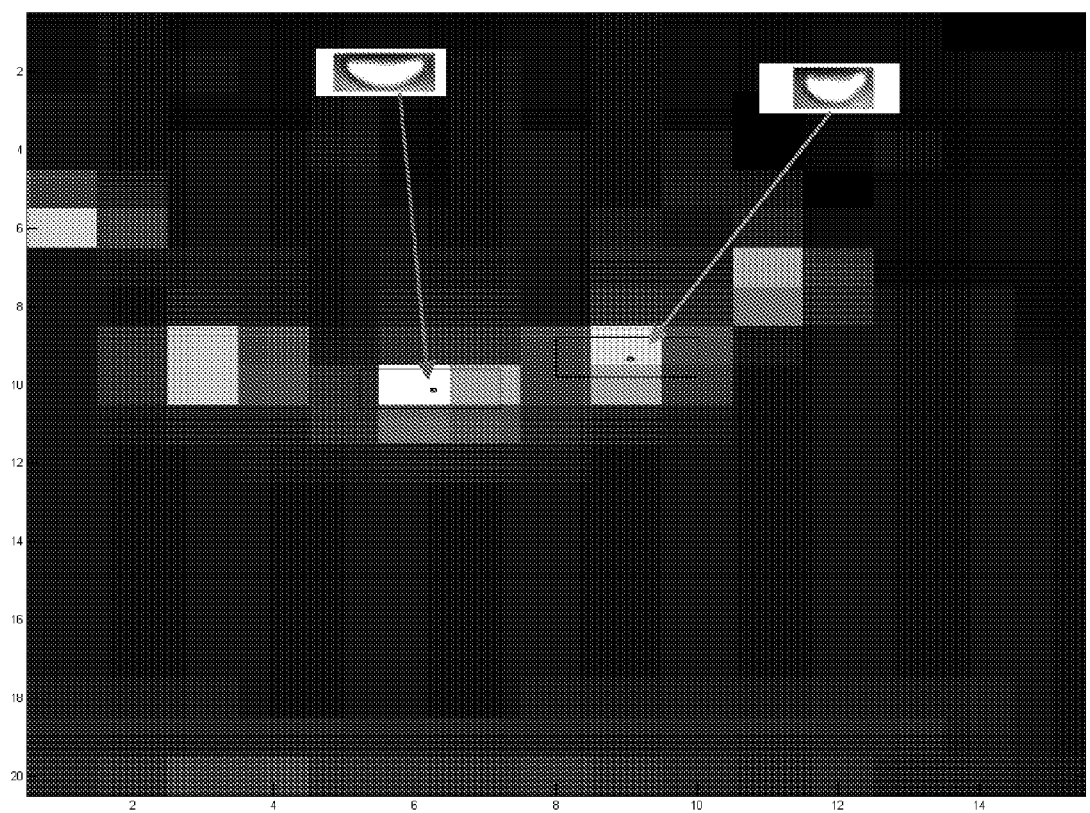

FIG. 3b illustrates an example such a coarse (decimated) grid. In the Figure the spots indicate the first estimation of the center-of-mass. We then take a 32×20 (say) grid around each of these. This is preferably used in conjunction with a differential approach to minimize noise, i.e. one frame laser on, next laser off.

Figure 3C:
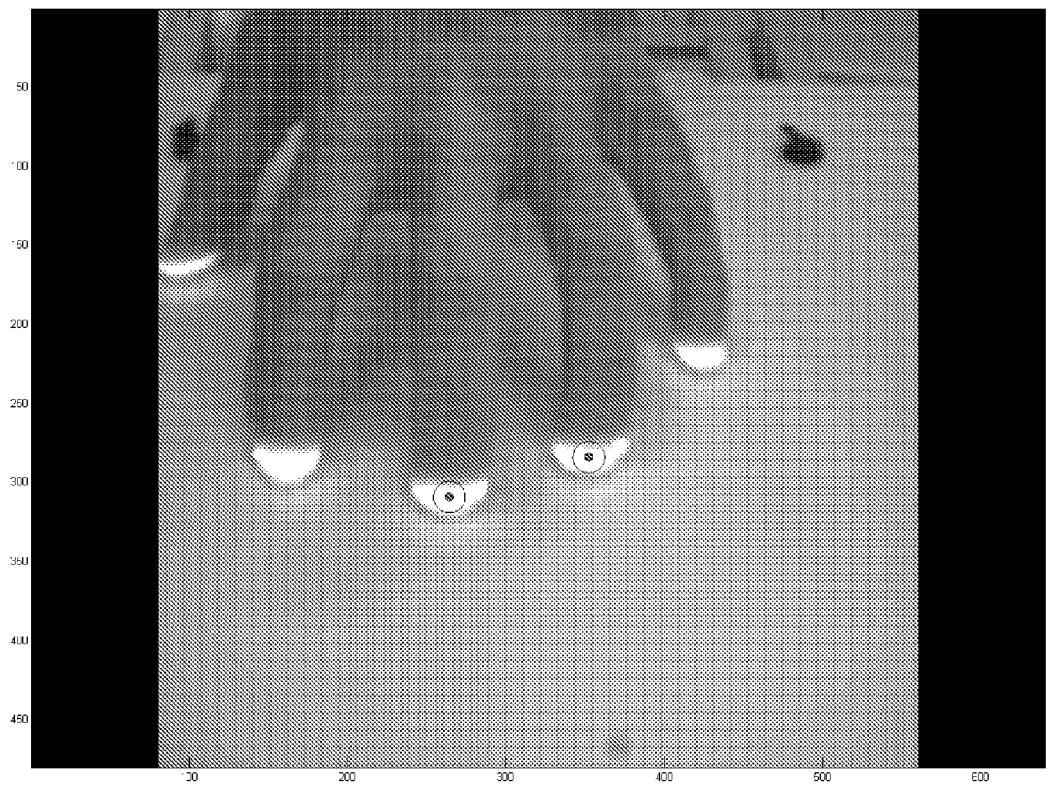

A centroid locator 310 (center of mass algorithm) is applied to the original (unthresholded) image in buffer 304 at each located peak, to determine a respective candidate finger/object location. FIG. 3c shows the results of the fine-grid position estimation, the spots indicating the finger locations found.

The system then applies distortion correction 312 to compensate for keystone distortion of the captured touch sense image and also, optionally, any distortion such as barrel distortion, from the lens of imaging optics 258. In one embodiment the optical access of camera 260 is directed downwards at an angle of approximately 70° to the plane of the image and thus the keystone distortion is relatively small, but still significant enough for distortion correction to be desirable.

Because nearer parts of a captured touch sense image may be brighter than further parts, the thresholding may be position sensitive (at a higher level for mirror image parts) alternatively position-sensitive scaling may be applied to the image in buffer 304 and a substantially uniform threshold may be applied.

In one embodiment of the crude peak locator 308 the procedure finds a connected region of the captured image by identifying the brightest block within a region (or a block with greater than a threshold brightness), and then locates the next brightest block, and so forth, preferably up to a distance limit (to avoid accidentally performing a flood fill). Centroid location is then performed on a connected region. In embodiments the pixel brightness/intensity values are not squared before the centroid location, to reduce the sensitivity of this technique to noise, interference and the like (which can cause movement of a detected centroid location by more than one pixel).

A simple center-of-mass calculation is sufficient for the purpose of finding a centroid in a given ROI (region of interest), and R(x,y) may be estimated thus:

$$x = \frac{\sum_{y_s=0}^{Y-1}\sum_{x_s=0}^{X-1} x_s R^n(x_s, y_s)}{\sum_{y_s=0}^{Y-1}\sum_{x_s=0}^{X-1} R^n(x_s, y_s)}$$

$$y = \frac{\sum_{y_s=0}^{Y-1}\sum_{x_s=0}^{X-1} y_s R^n(x_s, y_s)}{\sum_{y_s=0}^{Y-1}\sum_{x_s=0}^{X-1} R^n(x_s, y_s)}$$

where n is the order of the CoM calculation, and X and Y are the sizes of the ROI.

In embodiments the distortion collection module 312 performs a distortion correction using a polynomial to map between the touch sense camera space and the displayed image space: Say the transformed coordinates from camera space (x,y) into projected space (x',y') are related by the bivariate polynomial: $x'=xC_x y^T$ and $y'=xC_y y^T$; where $C_x$ and $C_y$ represent polynomial coefficients in matrix-form, and x and y are the vectorized powers of x and y respectively. Then we may design $C_x$ and $C_y$ such that we can assign a projected space grid location (i.e. memory location) by evaluation of the polynomial:

$$b=\lfloor x' \rfloor + X \lfloor y' \rfloor$$

Where is the number of grid locations in the x-direction in projector space, and [•] is the floor operator. The polynomial evaluation may be implemented, say, in Chebyshev form for better precision performance; the coefficients may be assigned at calibration. Further background can be found in our published PCT application WO2010/073024.

Once a set of candidate finger positions has been identified, these are passed to a module 314 which tracks finger/object positions and decodes actions, in particular to identity finger up/down or present/absent events. In embodiments this module also provides some position hysteresis, for example implemented using a digital filter, to reduce position jitter. In a single touch system module 314 need only decode a finger up/finger down state, but in a multi-touch system this module also allocates identifiers to the fingers/objects in the captured images and tracks the identified fingers/objects.

In general the field of view of the touch sense camera system is larger than the displayed image. To improve robustness of the touch sensing system touch events outside the displayed image area (which may be determined by calibration) may be rejected (for example, using appropriate entries in a threshold table of threshold module 306 to clip the crude peak locator outside the image area).

Ambient Light Suppression/Compensation

As previously described, a touch sensing system of the type described above is potentially vulnerable to ambient light and/or to touch artefacts created by techniques employed to suppress ambient light. We will describe a number of different techniques which may be employed to address these issues. These include (a) subtracting not the laser off frame itself but a time average of a number of laser off frames to "blur out" finger movement or similar; and (b) not using a laser off frame at all and instead estimating the background illumination through other means e.g. averaging the laser on frame over a long time period; as well as other techniques.

The Use of Multiple IR Filters

This takes advantage of the fact that the laser fan is a monochromatic source whereas ambient light (at least in the IR) is generally broad. One embodiment comprises a spatial arrangement of filters in front of the camera pixels such that, alternating pixels can and cannot detect the laser fan or, more generally, detect the light of the laser fan to differing degrees. In this way there is no time gap between the laser on and background images thus potential artefacts due to moving objects are suppressed. Additionally only one frame is required so the effective capture rate increased and the latency is reduced. There is no need for a "laser off" frame in embodiments of these techniques.

The inventors have extended this technique by researching the IR transmissive properties of the pixel filters used in color cameras: in general the three color filters (red R, green, G and blue B) have different IR responses. Thus the data from two or three of the different colored pixels in a color camera may be used to implement a version of this technique (especially where the background ambient light is broadly smooth over the visible, RBG, range). Each pixel detects both the ambient background and the substantially monochromatic projected touch sensing illumination. However pixels with different colored filters detect these in different proportions. Thus, say, a red pixel might detect 0.9A+1.1 B (where A and B represent fan IR and ambient respectively), and, say, a blue pixel might detect 0.7A+1.0B—giving two equations and two unknowns, allowing these to be solved for A (and/or B). Where three colored pixels are employed the equations are over-determined and, for example, a least squares fit may be employed to determine a better estimate for B.

This is explained further rising the equations below, where $I_r$, $I_g$, $a_r$, $b_r$, $a_g$, $b_g$, $L_{Fan}$, $L_{Background}$ represent, respectively, the light intensity signal from a red and from a green pixel (the red and green colors are merely examples), the response of the red pixel to light from the fan (plane of touch sensing light) and from the background respectively, the response of the green pixel to light from the fan and from the background respectively, and the actual light level from the fan and from the background.

$$I_r = a_r L_{Fan} + b_r L_{Background} \quad (1)$$

$$I_g = a_g L_{Fan} + b_g L_{Background} \quad (2)$$

$$\frac{I_r}{b_r} - \frac{I_g}{b_g} = \frac{a_r}{b_r} L_{Fan} - \frac{a_g}{b_g} L_{Fan} = \left(\frac{a_r}{b_r} - \frac{a_g}{b_g}\right) L_{Fan} \quad (3)$$

Equation (3) defines a solution of simultaneous equations (1) and (2) for the level of scattered (IR) light, $L_{Fan}$. In the final equation, equation (3), each of $I_r$, $I_g$, $a_r$, $b_r$, $a_g$, $b_g$ is known ($a_r$, $b_r$, $a_g$, $b_g$ can be determined by measuring the camera's color filter beforehand and may be stored in non-volatile memory) and thus $L_{Fan}$ can be determined.

Depending upon the variation of the pixel responses with wavelength it may also be preferable to add an IR-bandpass filter in front of the camera. This is helpful when, for example, the pixel colors, say red and green, have a similar sensitivity to the fan IR wavelength, making it difficult to separate the IR from the background using the above equation. In this case an artificially different IR response can effectively be created by adding an IR notch filter which is wide enough not just to encompass the laser but also some IR band (say <50 nm or <30 nm) to one, other or both sides of this. (This is because the responses of the two differently colored pixels will be different over the width of the IR notch filter).

Signal Filtering at the Pixel Level

Each camera pixel has local circuitry which receives both the light signal from the pixel and a modulation applied to the laser fan. The circuitry substantially rejects any signal component which doges not match the modulation signal. This may be a single frequency or a more complex pseudo random modulation. The latter is better at rejecting other background oscillating signals.

More generally, in the time domain the system may employ something other than simple on-off laser modulation: This may be any arbitrary modulation where more than just a single laser on and a single laser off image are used in the subsequent processing. Use of a patterned laser fan with a high resolution camera Encode a spatial pattern in the laser fan, for example using a diffractive optical element (DOE). This is detected by the camera and a captured image component which does not have this spatial pattern may then be rejected.

High speed fan modulation with a short timescale rolling shutter The camera may have a rolling shutter, that is different rows of pixels detect light at different times. If the integration time is reduced to <10, <5 or just one or two rows, and the fan laser is modulated at high speed, then the real touch events can be seen as a vertical oscillation in the image. This can be filtered for in a similar way to the filtering for a spatial pattern described above.

Figure 3D:
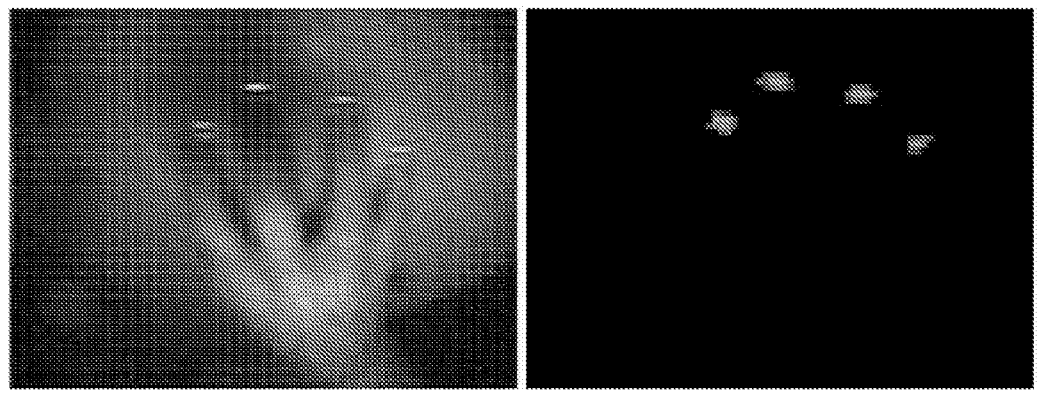

FIG. 3d illustrates the use of this method. The left image is the raw camera image and the right image is the processed low resolution bitmap. The processing method uses a 1 D spatial frequency notch filter followed by a thresholding step. Furthermore these concepts can be generalized as specific implementations of the underlying concept of patterning the image which the laser fan produces on the image sensor, and filtering out image data which does not reproduce this pattern.

Use of Multiple 'Laser Off Images to Filter Out Ambient Light Artefacts

Figure 3E:
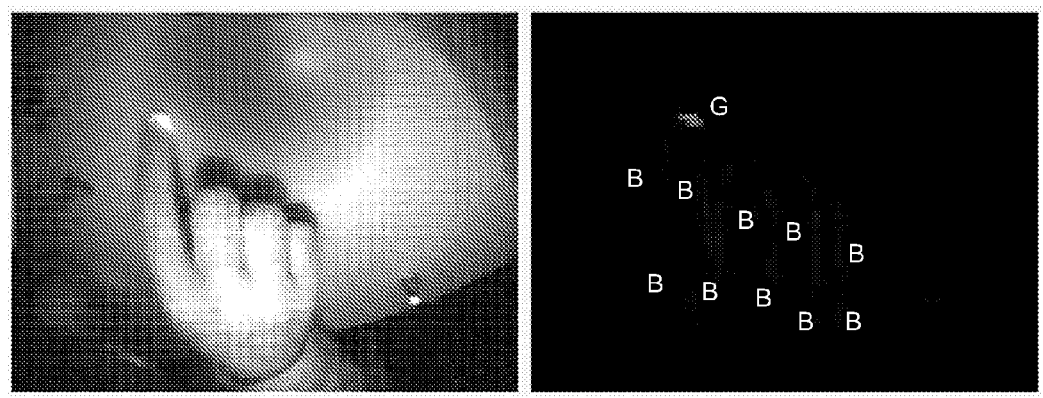

Some preferred approaches use 'laser off images on both temporal sides of (before and after) a laser-on image to filter out ambient light artefacts. This has been found to work well in practice and has only a single frame latency. There is a range of different filtering techniques which may be employed including, for example:

Max filter: In this case the background signal is taken as the pixel-by-pixel (or bin-by-bin) maximum of the background images surrounding (before and after) the 'laser on' image. This has been found to work particularly well in practice. FIG. 3e illustrates the use of the max filter algorithm. The left image is the raw camera image and the right image is the processed low resolution bitmap. The green (G) is the touch valid signal. The blue (B) shows the signal areas which have been blocked by the max algorithm. Depending on whether the foreground or background images are taken first either the leading or trailing edges of the moving fingers may produce false touch events. These may be suppressed using a technique such as that described below.

Mask filter: In this case two difference images are calculated: the laser on image minus the previous background; and the laser on image minus the following background. One of these then masks the other—in other words a signal is only taken if it appears in both images. This has an advantage over the max filter where only one frame buffer is available in that the mask from the first background subtracted image may be stored as just a single bit.

Figure 3F:
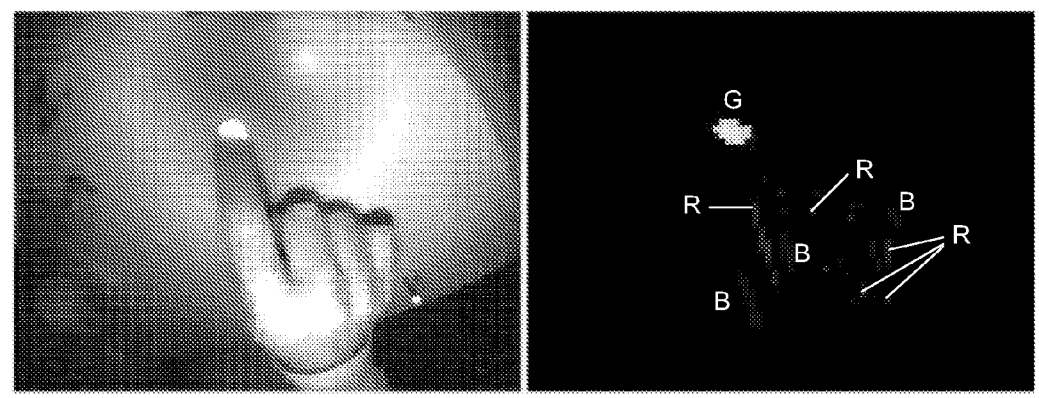

FIG. 3f illustrates the use of the max filter algorithm. The left image is the raw camera image and the right image is the processed low resolution bitmap. The processing has three colors. The red (R) shows touch events produced by the foreground—first background ($BG_A$). The blue (B) is from the foreground—second background ($BG_B$). The green (G) is $BG_B$ masked by $BG_A$>0.

Optionally the background subtracted (difference) images may be kept signed and each row summed. Where that sum is less than zero then the positive parts of the image can be set as zeroes. To implement this data in a (each) row is summed and the data is effectively discarded if the sum is negative (or positive but approximately zero). This helps to suppress artefacts arising from 'hand waving' ambient light shadows. The skilled person with appreciate that similar (digital) filtering techniques may be employed with more than two image frames.

A related approach employs averaging of multiple laser-off frames: In embodiments this approach employs a form of rolling average of the background frames, primarily to remove dark shadowing artefacts. In one example the background is updated with a new laser off image by evaluating $$BG'=(1-a)\cdot BG + a\cdot L_{OFF} \qquad (4)$$

where BG represents a current (or old) background (ambient light) image, and BG' a new (or current) background (ambient light) image, $L_{OFF}$ represents an image captured when the laser is off (or an image derived from this), and a is a parameter representing the influence of the latest image on the previously filtered images (rolling average).

The averaged laser-off frames subtracted from a laser-on image may be from before and/or after the laser-on image. For example a difference image $L_{Dm}$ at time t may be calculated using laser-off and laser on images, "Off" and "On", at before and after times t−1 and t+1 respectively, from:

$$L_{Diff}{}^{t} = \alpha^{t-1}\cdot L_{Off}{}^{t-1} + \beta^{t} L_{On}{}^{t} + \alpha^{t+1}\cdot L_{Off}{}^{t+1}$$

where, for example, the parameters $\alpha^{t+1}$, $\alpha^{t-1}$, and $\beta^{t}$ may be −0.5, −0.5 and +1.0 respectively (or with signs reversed). (This can result in a rather complicated positive and negative edge structure from movement between the images, but this can be addressed, if desired, using techniques described later).

The skilled person will appreciate that other similar schemes using surrounding (before and after) background images may alternatively be employed.

Background Extraction from on Frames

In embodiments no laser-off image is captured and instead extract an image of the background ambient light is determined from the laser on image(s). In one embodiment the signal processing determines the median of past images after filtering out where a touch event is deemed to have occurred. In a more complex approach one or more selection rules may additionally or alternatively be employed to determine when to change an internal stored version of a background image based on a most recent captured image.

Use of Negative Background Subtracted Image Areas to Cancel Out False Positives

Figure 3G:
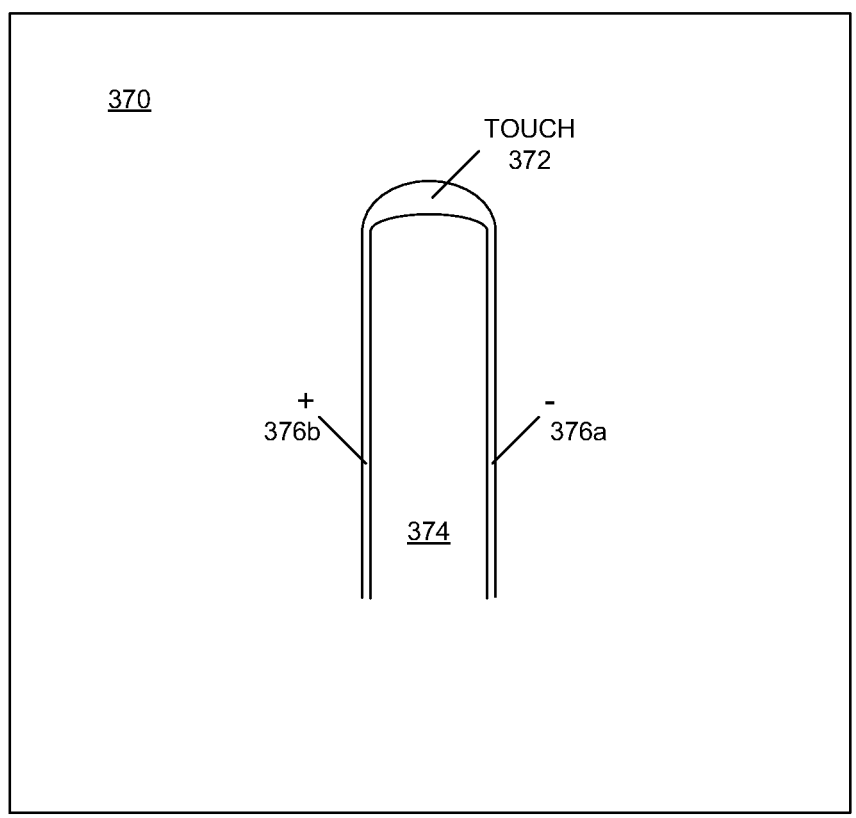

Referring now to FIG. 3g, this shows an example of a difference image 370 determined by subtracting a laser-off touch sense image from a laser-on touch sense image, illustrating the artefacts which can arise from a moving shadow, in this example from a finger. A shadow moving over the captured touch sense image will result in a change from light to dark as the shadow moves over a new part of the image, and this will result in a positive edge 376b in the difference image. Where the shadow leaves part of the touch sense image the change from dark to light will result in a negative edge 376a in the difference image. In FIG. 3g the true part of the touch is region 372.

In embodiments sensitivity of the touch sense system to such artefacts may be reduced by eroding all areas of the difference image until the negative regions (such as region 376a) are removed, at which point it may be assumed that false positives (such as region 376b) have also been eroded away. The erode function may be implemented, for example, by morphological image processing.

The erode function may be performed selectively across rows of an image (rather than down columns), where the columns of a captured image run parallel to a direction of light propagation from the IR source and the rows run perpendicular to this direction. This is because the type of artefacts generated tend to be of the type shown in FIG. 3g, by shadows such as a hand shadow sweeping across the image.

A one-directional erode may be implemented by applying the following algorithm to groups of three (or more) pixels in a row, where the value of each pixel may be positive, negative, or zero:

If the minimum value amongst the three pixels is greater than zero set the center pixel to the minimum value If the maximum value amongst the three pixels is less than zero [implying all three pixels are negative] set the center pixel to the maximum value Else set the center pixel to zero [implying that some pixels are positive and some are negative] A related method employs a blur algorithm on the assumption that the negative and false positive areas are close to each other (this can also result as an artifact of a moving shadow). In one implementation the signal processing blurs the pixels of the difference image sufficiently to substantially cancel the false positive and negative regions with one another; this does not significantly impact calculation of the centroid position for true positives (touch images).

Detect the Speckle of the Laser Fan to Distinguish its Signal from the Background An image derived from a captured touch sense image may be filtered to filter out any signal in the image which does not have a high spatial frequency component (laser speckle can result a high spatial frequency component in the image). In embodiments the captured image may be intentionally defocused to increase the laser speckle.

Related techniques may otherwise employ the monochromatic coherent nature of the laser fan to distinguish it from the background.

Ambient Light Compensation Implementation

Figure 4A:
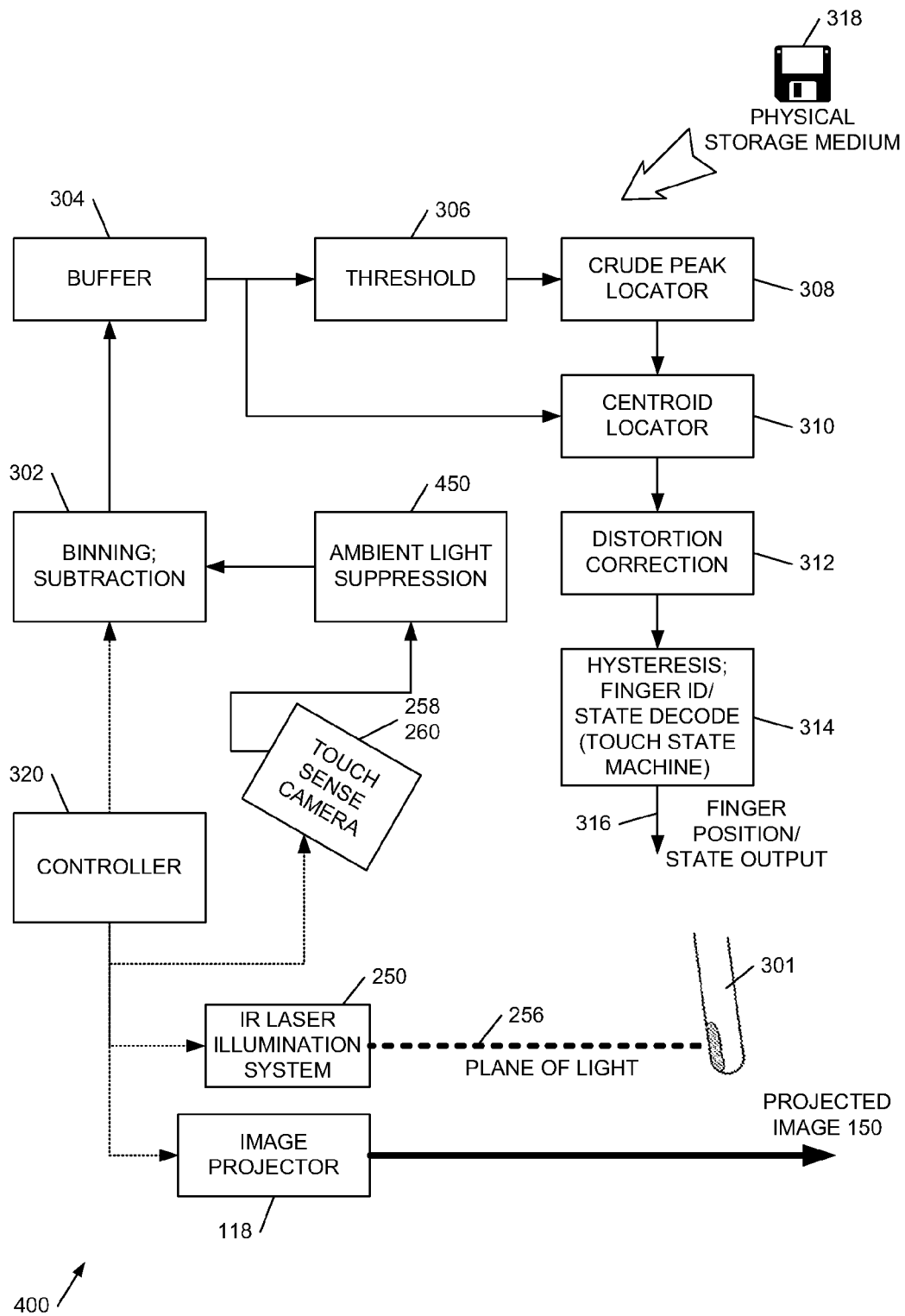
FIGS. 4a and 4b show embodiments of a touch sensing display device according to aspects the invention.

Referring now to FIG. 4a, in which like elements to those of FIG. 3 are indicated by like reference numerals, this shows an embodiment of a touch sensing display device 400 according to aspects the invention. The above described ambient light suppression techniques may be implemented by a software (and/or hardware) ambient light suppression module 450. The suppression module 450 may receive touch sense images either directly from camera 260 (as illustrated) or, for example, from module 302, after binning. The module then implements a signal processing procedure, for example as described above.

Use of Two Fans at Two Different Wavelengths and Matched Filters

In one embodiment two fans or planes of light are employed at two different wavelengths and respective matched notch filters are used to distinguish these. Preferably each captured image frame has the laser on and no laser-off image is captured. The images at, say, 60 Hz (50 Hz), are captured with a spatial and/or temporal variation in the application of the notch filters to the camera.

Use of Two Fans with Different Spatial Arrangements

In one embodiment two fans or planes of light are employed at two different spatial positions, for example a higher and lower fan. Images from these are captured in different, for example alternate, camera frames.

When a finger intersects both fans there is a vertical oscillation in the detected signal in the camera image(s). Where only the top fan is intersected only an on-off signal is observed. This can be used to distinguish a touch signal from the ambient background.

Optionally information may also be extracted to determine whether a finger (or other object) is near or substantially touching the image.

This approach may be extended to more than two fans.

Multiple Fan Implementation

Figure 4B:
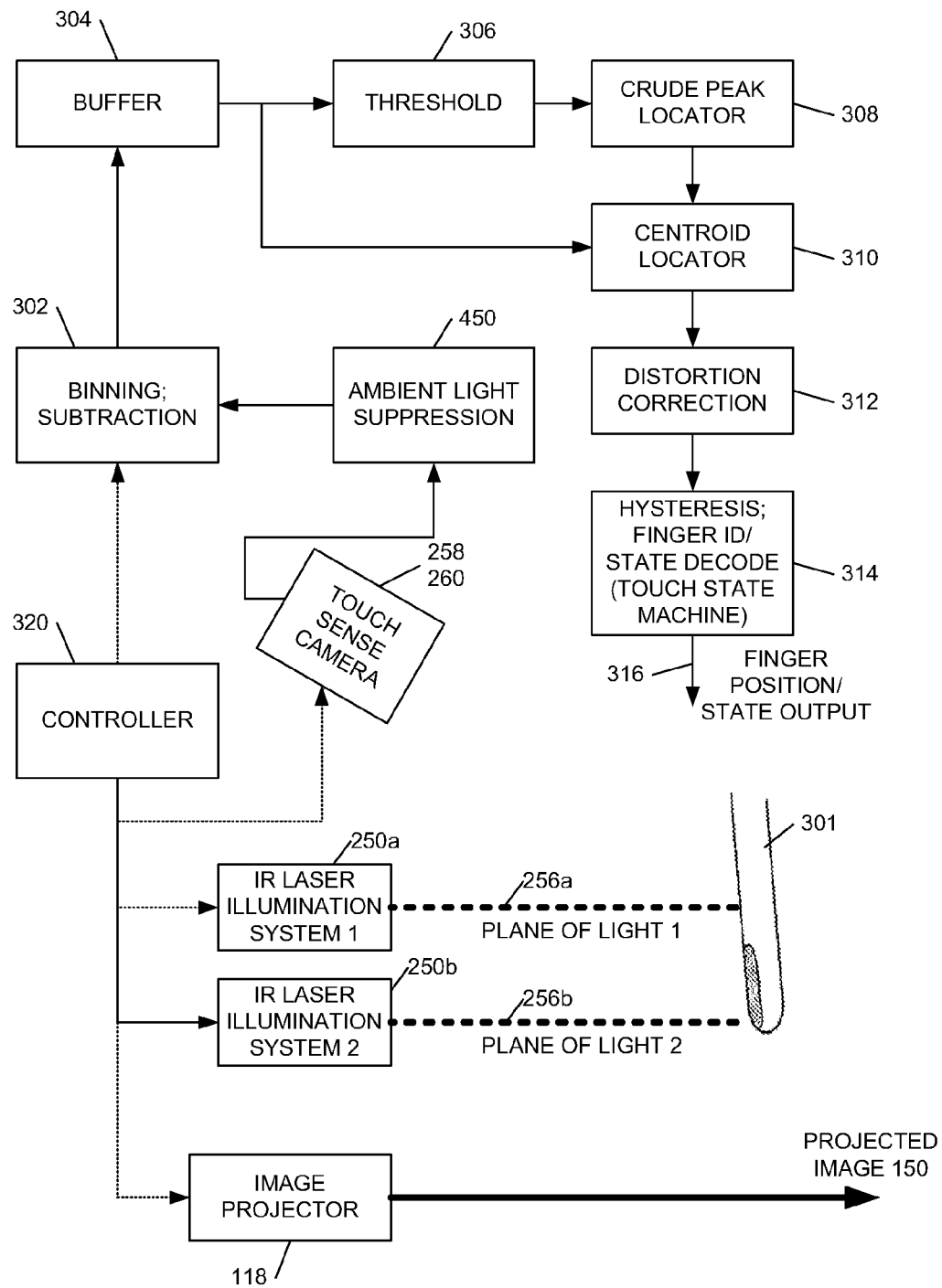

FIG. 4b shows a variant touch sensing display device 420, similar to that of FIG. 4a and including hardware 250a,b to generate two fans of light 256a,b to implement the above described techniques.

Filtering Out Shadowed Events

Figure 5A:
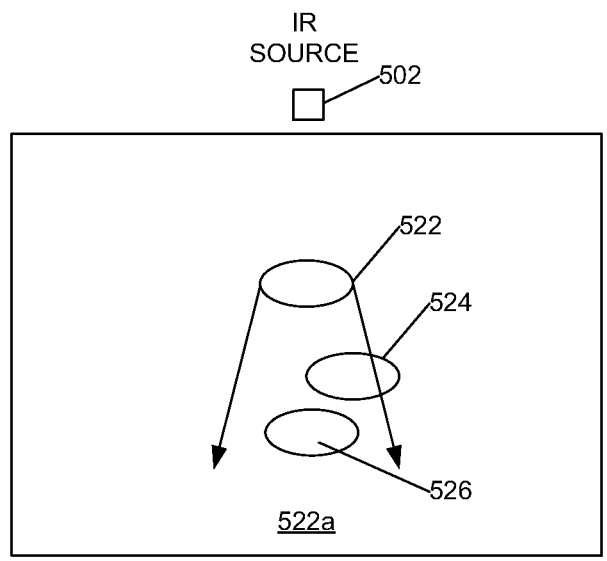
FIGS. 5a to 5c show, respectively, example captured touch sense images illustrating shadowing, and an embodiment of a touch sensing display device configured to filter out shadowed events.
Figure 5B:
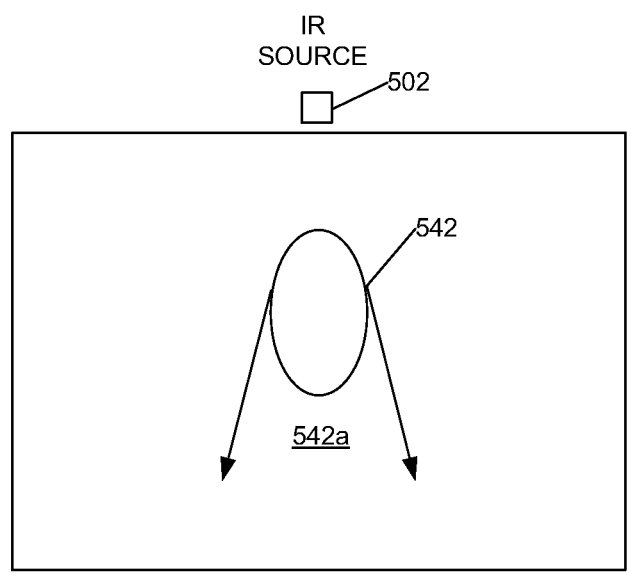

FIG. 5a shows an example captured touch sense image illustrating shadowing: finger image 522 creates a shadow 522a which partially obscures the image of a second finger 524. Conversely, a putative finger position 526 cannot be a true detection of a finger because the scattered light from region 526 lies entirely within shadow 522a. In FIGS. 5a and 5b the arrows on the shadow borders indicate the direction of light propagation, diverging in straight lines away from IR source 502 in a fan shape.

FIG. 5b shows an example captured touch sense image illustrating another type of putative object detection which may be filtered: object image 542 creates a shadow 522a but an object of this spatial extent would partially lie in its own shadow because it has a greater than threshold length in a direction away from IR source 502.

In embodiments the signal processing may be configured to filter out events (and/or captured light) which may be determined as not due to the light fan: For example, objects with a large extent in the direction of the fan light propagation cannot be due to the light fan so may be rejected.

Similarly the system may be configured to filter out events (and/or captured light) which are predicted to be shadowed, for example where it is known that light from the laser fan cannot have reached a particular point in the image. This may be, for example due to a second touch event between the candidate touch signal or light and the fan origin, or due to another object deemed not to be a touch event (i.e. not 'finger-like') but which still should be blocking the laser fan.

Shadowed Event Filtering Implementation

Figure 5C:
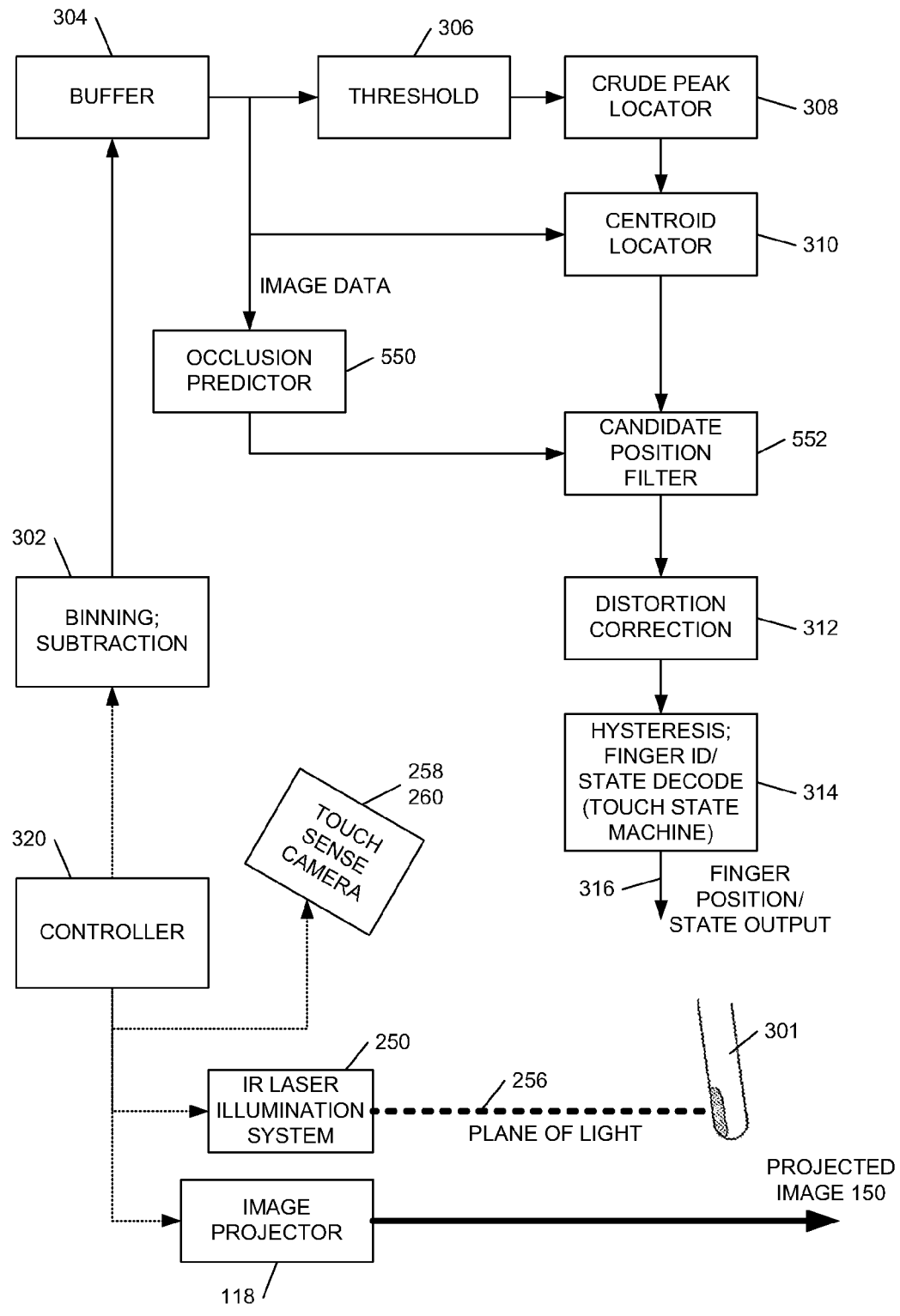

FIG. 5c, in which like elements to those of FIG. 3 are indicated by like reference numerals, shows an embodiment of a touch sensing display device 500 configured to filter out shadowed events. The arrangement of FIG. 5c uses an occlusion predictor module 550 (implemented in software and/or hardware) coupled to receive image data from buffer 304 to define an "ignorance" mask which can be applied to the captured image data to define missing portions of the image data. The mask may be defined by projecting the diverging geometry of the plane of light from the IR laser illumination from the IR source, and identifying as masked regions beyond those from which scattered light is observed in the image. This mask is then applied to a candidate position filter 552, to filter out candidate object/finger detections in the masked region.

The skilled person will recognize that the occlusion predictor may operate on image data either before or after the distortion correction is applied.

Additionally or alternatively the occlusion predictor may receive finger/object position data from module 314, and predict occluded regions of a captured touch sense image (either before or after distortion correction) from these positions, again using a geometric projection of touch sensing light from the IR source.

Use of a line camera in addition to an imaging camera

Figure 6A:
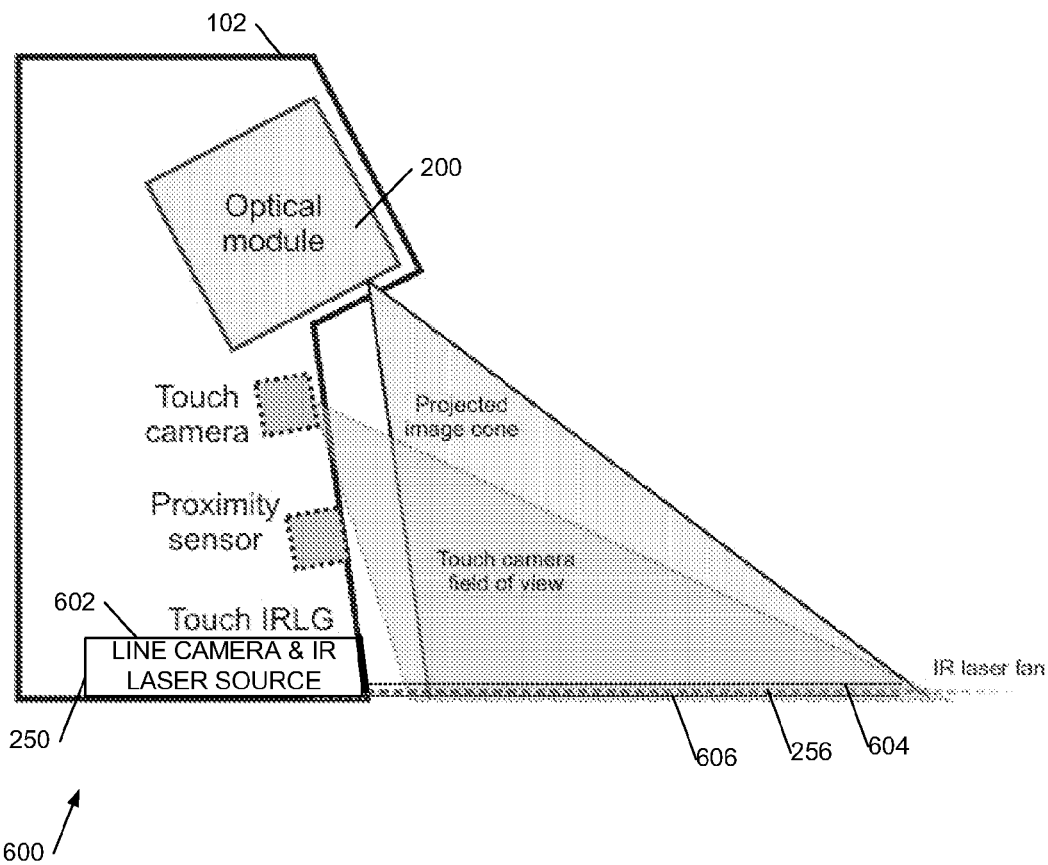
FIGS. 6a and 6b show, respectively, a holographic image projection system employing a line camera in addition to a 2D imaging camera, and aperture encoding for a holographic image projection system employing just a line camera.

Referring to FIG. 6a, embodiments of the system 600 may employ a line imaging camera 602 located close to the source laser fan and looking along the direction of propagation of the fan, in addition to a 2D imaging camera looking down on the fan. In embodiments the line camera look substantially only into the plane of the fan of the fan. In FIG. 6s dashed lines 604, 606 indicate the field of view of line camera 602.

A touch sense signal is accepted as a genuine touch event only when images from the two cameras correlate. This rejects spurious signals from out of the plane of the laser fan 256.

Use of Just a Line Camera

Other embodiments of the system may employ just a line imaging camera located close to the source laser fan and looking along the direction of propagation of the fan, omitting the 2D imaging camera. In such a system aperture encoding may be employed to extract depth information from the camera in line with the laser fan.

Figure 6B:
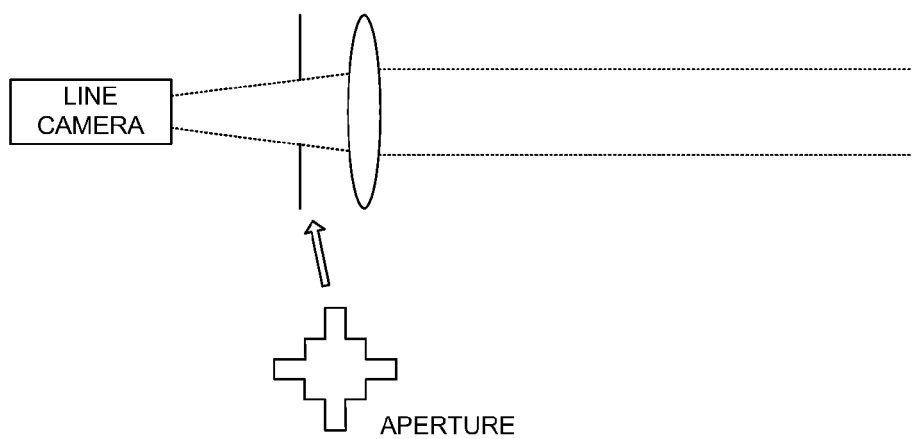

FIG. 6b illustrates the principle of aperture encoding: a complex aperture shape is employed between the imaging optics and camera sensor of the line camera. When the camera is in focus an image of the object appears on the sensor but when the camera is out of focus the image on the sensor is effectively convolved with a function representing a combination of the aperture and the imaging optics. If an object is out of focus the distance of the object may be determined from the degree of blurring (which is also different depending on whether the object is too near or too far to be in focus). Thus embodiments of the system process this blurring to determine the distance of the object from the line camera. (The direction of the object can be determined from the location of the object along the line image, since objects at different angles to the optical axis are imaged at different locations).

Figure 7A:
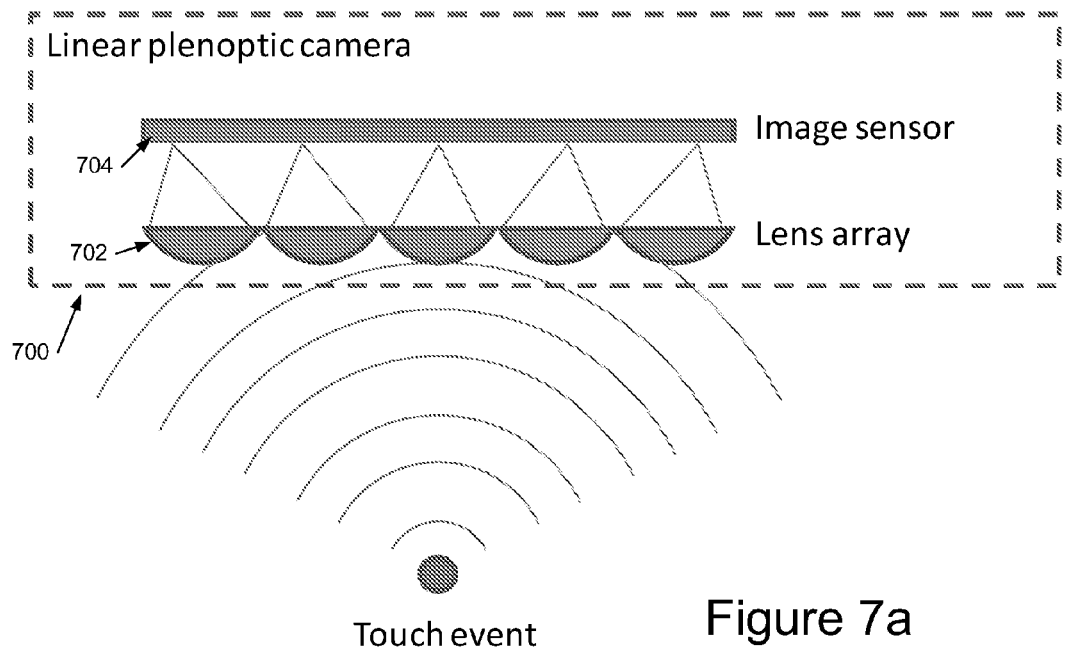
FIGS. 7a and 7b show, respectively, use of a linear plenoptic camera to record touch events, and a schematic diagram of an interleaved plenoptic camera.

Referring to FIG. 7a, still further embodiments of the system may employ a plenoptic camera 700, extracting intensity and direction information from the light arriving at the camera lens, to extract depth and position of the touch event.

As illustrated in FIG. 7a, each lens or lenslet of the lens (microlens) array 702 images to multiple pixels on the (line) image sensor 704. Different lenses image the touch event to different positions on their respective sets of pixels, thus allowing the distance to the event to be determined by, effectively, triangulation (the direction to the event may be determined from the line image position). In a more sophisticated approach the distance and direction may be determined by measuring a phase profile at the sensor and then propagating this back to determined the location of the touch event. Embodiments also extract the intensity of the touch event image, for example by integrating the light received through the lenslet array.

Figure 7B:
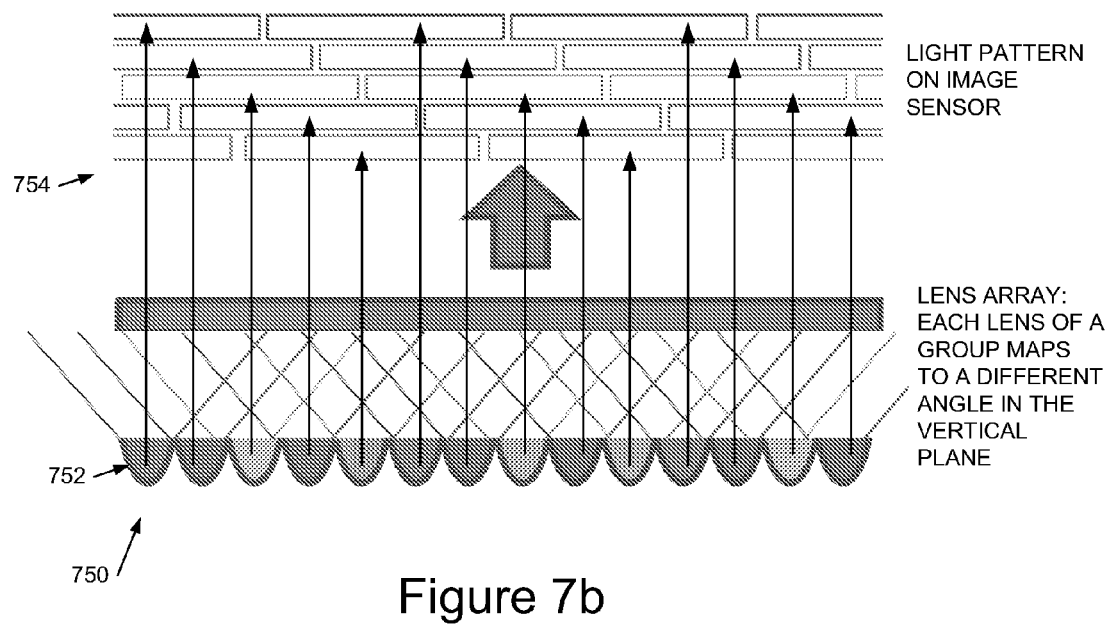

In a variant of this approach, an "interleaved" plenoptic camera 750 may be used as illustrated in FIG. 7b. In FIG. 7b a lens array 752 comprises groups of lenses and within each group each lens maps to a different angle in the vertical plane, and hence to a different vertically displaced stripe on the (2D) image sensor 754. This optical arrangement of the lenticular lens array in making the camera plenoptic interleaves the phase information.

In another approach, two (non-plenoptic) line cameras may be employed for triangulation to determine distance to the touch event.

Other Techniques for Ambient Light Suppression

These include: i) Use of a field-scanned camera with a short shutter time and a short fan laser pulse to substantially remove the ambient light; ii) Use of a longer wavelength laser, where the ambient light level intensity is less; iii) Use of a UV laser—sunlight is the main ambient source of UV but this is usually effectively blocked by glass windows; iv)

Use of both UV and IR—most ambient light tends to contain either UV or IR (except sunlight, but see the previous comment), so use both UV and IR signal components and keep only the signal that shows up from both; v) Employ a depth dependent pattern generator to generate a light pattern which changes with distance above the table, for example using Talbot re-imaging; vi) Employ a coherent light detector—mix the detected light with a reference and look for the interference generated heat pattern; and vii) Use past background images to estimate (extrapolate) the current background when the laser-on image is captured for example the system may track a finger shadow moving across the table (display surface) and predict where it should be to avoid the potential false positive this can cause.

Adaptive frame rate Embodiments of the touch sensitive display device may implement multiple modes of operation for use in different ambient light levels, for example using a sensor to detect an ambient light level and a mode control system to select an operational mode of an ambient light suppression system in response. The sensor may, for example, comprise an existing sensor such as proximity sensor 104 and/or a signal from the touch camera system 258, 260.

In one embodiment, under low ambient conditions the system uses no background frames and therefore obtains 60 Hz (or 50 Hz) touch recognition with little latency. Higher ambient conditions (start to) use background subtraction, thus getting 30 Hz (25 Hz) recognition, (off then on) with 0-16 ms latency.

Higher ambient light level conditions employ 'laser off' images on both (temporal) sides of a laser on image to filter out ambient light artefacts, and thus the background after the laser on image is used. This maintains 30 Hz (25 Hz) touch but increases latency.

Preferably the selection technique quickly changes to more robust methods and slowly changes to low ambient light level methods, to avoid jitter between methods impacting the user experience where the ambient levels are marginal.

It will be appreciated that for the touch sensing system to work a user need not actually touch the displayed image. The plane or fan of light is preferably invisible, for example in the infrared, but this is not essential—ultraviolet or visible light may alternatively be used. Although in general the plane or fan of light will be adjacent to displayed image, this is also not essential and, in principle, the projected image could be at some distance beyond the touch sensing surface. The skilled person will appreciate that whilst a relatively thin, flat plane of light is desirable this is not essential and some tilting and/or divergence or spreading of the beam may be acceptable with some loss of precision. Alternatively some convergence of the beam towards the far edge of the display area may be helpful in at least partially compensating for the reduction in brightness of the touch sensor illumination as the light fans out. Further, in embodiments the light defining the touch sheet need not be light defining a continuous plane—instead structured light such as a comb or fan of individual beams and/or one or more scanned light beams, may be employed to define the touch sheet. In general in the above, references to on-off modulation include amplitude modulation in which the laser output changes between a state in which the laser is on and a state in which the laser is substantially off as well as binary on-off modulation.

No doubt many other effective alternatives will occur to the skilled person. It will be understood that the invention is not limited to the described embodiments and encompasses modifications apparent to those skilled in the art lying within the spirit and scope of the claims appended hereto.

What is claimed is:

1. A touch sensitive image display device, the device comprising:
    an image projector to project a displayed image onto a surface in front of the device;
    a touch sensor light source to project a plane of light above said displayed image;
    a camera directed to capture a touch sense image from a region including at least a portion of said plane of light, said touch sense image comprising light scattered from said plane of light by an object approaching said displayed image; and
    a signal processor coupled to said camera, to process a said touch sense image from said camera to identify a location of said object relative to said displayed image; wherein:
    said touch sensor light source is on-off modulated;
    said signal processor is configured to determine two difference images, a first difference image between said touch sense image captured when said touch sensor light source is on and a preceding said image captured when said touch sensor light source is off, and a second difference image between said touch sense image captured when said touch sensor light source is on and a following said image captured when said touch sensor light source is off, and to compensate, for a level of ambient light in said captured touch sense image captured when said touch sensor light source is on, by selecting data, for processing to identify said location of said object, dependent on said two difference images, and
    said selecting comprises using one of said two difference images as a mask for the other of said two difference images.

2. A touch sensitive image display device as claimed in claim 1, wherein said signal processor is configured to determine a difference between said captured touch sense image captured when said touch sensor light source is on and a weighted sum of each of said images captured when said touch sensor light source is off.

3. A touch sensitive image display device as claimed in claim 1, wherein said signal processor is configured to determine an estimated image of said ambient light by comparing corresponding pixels or regions of said images captured when said touch sensor light source is off to determine, for each pixel or region, a maximum detected light level in said images.

4. A touch sensitive image display device as claimed in claim 1, wherein said signal processor is configured to determine an estimated image of said ambient light by digitally filtering said images captured when said touch sensor light source is off.

5. A touch sensitive image display device as claimed in claim 4, wherein said digital filtering comprises combining a previous said estimated image of said ambient light with a subsequent said image captured when said touch sensor light source is off.

6. A touch sensitive image display device, said device comprising:
    an image projector to project a displayed image onto a surface in front of the device;
    a touch sensor light source to project a plane of light above said displayed image;
    a camera directed to capture a touch sense image from a region including at least a portion of said plane of light, said touch sense image comprising light scattered from said plane of light by an object approaching said displayed image; and a signal processor coupled to said camera, to process a said touch sense image from said camera to identify a location of said object relative to said displayed image; wherein:

said touch sensor light source is on-off modulated;

said signal processor is configured to determine two difference images, a first difference image between said touch sense image captured when said touch sensor light source is on and a preceding said image captured when said touch sensor light source is off, and a second difference image between said touch sense image captured when said touch sensor light source is on and a following said image captured when said touch sensor light source is off, and to compensate, for a level of ambient light in said captured touch sense image captured when said touch sensor light source is on, by selecting data, for processing to identify said location of said object, dependent on said two difference images, and, said selecting is performed on a row-by-row basis.

7. A touch sensitive image display device as claimed in claim 6, wherein said signal processor is configured to determine a difference between said captured touch sense image captured when said touch sensor light source is on and a weighted sum of each of said images captured when said touch sensor light source is off.

8. A touch sensitive image display device as claimed in claim 6, wherein said signal processor is configured to determine an estimated image of said ambient light by comparing corresponding pixels or regions of said images captured when said touch sensor light source is off to determine, for each pixel or region, a maximum detected light level in said images.

9. A touch sensitive image display device as claimed in claim 6, wherein said signal processor is configured to determine an estimated image of said ambient light by digitally filtering said images captured when said touch sensor light source is off.

10. A touch sensitive image display device as claimed in claim 9, wherein said digital filtering comprises combining a previous said estimated image of said ambient light with a subsequent said image captured when said touch sensor light source is off.

11. A method of ambient light interference suppression in a touch sensitive image display device, the device comprising:

an image projector to project a displayed image onto a surface in front of the device;

a touch sensor light source to project a plane of light above said displayed image;

a camera directed to capture a touch sense image from a region including at least a portion of said plane of light, said touch sense image comprising light scattered from said plane of light by an object approaching said displayed image; and a signal processor coupled to said camera, to process a said touch sense image from said camera to identify a location of said object relative to said displayed image;

the method comprising:

amplitude modulating said touch sensor light source;

determining a first difference image between said touch sense image captured when said touch sensor light source is on and a preceding image when said touch sensor light source is off;

determining a second difference image between said touch sense image captured when said touch sensor light source is on and a following said image captured when said touch sensor light source is off;

compensating for a level of ambient light in said captured touch sense image captured when said touch sensor light source is on, by selecting data, for processing to identify said location of said object, dependent on said two different images;

wherein selecting data comprises using one of said two difference images as a mask for the other of said two difference images; and selecting is performed on a row-by-row basis.

12. A method of ambient light interference suppression as claimed in claim 11, the method further comprising determining, from corresponding pixels or regions of said images captured when said touch sensor light source is off, for each pixel or region a function of a detected light level in said images when said touch sensor light source is off, to determine an image of said ambient light; and compensating for said ambient light in said captured touch sense image captured when said touch sensor light source is on using said image of said ambient light.

13. A method of ambient light interference suppression as claimed in claim 11, the method further comprising comparing corresponding pixels or regions of said images captured when said touch sensor light source is off to determine, for each pixel or region, a maximum detected light level in said images when said touch sensor light source is off; using said maximum detected light levels to determine an image of said ambient light; and compensating for said ambient light in said captured touch sense image captured when said touch sensor light source is on using said image of said ambient light.

14. A method of ambient light interference suppression as claimed in claim 11, wherein the device further comprises:

a non-transitory data carrier carrying processor control code to implement the method.

* * * * *